US012646924B2

(12) United States Patent
Shiraishi

(10) Patent No.: US 12,646,924 B2
(45) Date of Patent: Jun. 2, 2026

(54) METHOD FOR CONTROLLING POWER SUPPLY SYSTEM OF MOBILE BODY, POWER SUPPLY SYSTEM OF MOBILE BODY, AND ENERGY STORAGE APPARATUS

(71) Applicant: GS Yuasa International Ltd., Kyoto (JP)

(72) Inventor: Takeyuki Shiraishi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 773 days.

(21) Appl. No.: 17/916,376

(22) PCT Filed: Mar. 24, 2021

(86) PCT No.: PCT/JP2021/012109
§ 371 (c)(1),
(2) Date: Sep. 30, 2022

(87) PCT Pub. No.: WO2021/205872
PCT Pub. Date: Oct. 14, 2021

(65) Prior Publication Data
US 2023/0155372 A1 May 18, 2023

(30) Foreign Application Priority Data
Apr. 7, 2020 (JP) ................................. 2020-068793

(51) Int. Cl.
*H02J 7/80* (2026.01)
*B60L 3/00* (2019.01)
(Continued)

(52) U.S. Cl.
CPC ............. *H02H 7/18* (2013.01); *B60L 3/0046* (2013.01); *B60L 3/04* (2013.01); *H01M 10/425* (2013.01);
(Continued)

(58) Field of Classification Search
CPC .. H02J 7/00302; H02J 7/0047; H01M 10/425; H01M 10/48
(Continued)

(56) References Cited

U.S. PATENT DOCUMENTS

2018/0281615 A1    10/2018    Kinoshita
2019/0126761 A1*    5/2019    Verbridge ......... H01M 10/4207
(Continued)

FOREIGN PATENT DOCUMENTS

JP        2012-210074 A      10/2012
JP        2015-067042 A       4/2015
(Continued)

OTHER PUBLICATIONS

International Search Report and Written Opinion for International Application No. PCT/JP2021/012109, dated Jun. 1, 2021, (9 pages), Japan Patent Office, Tokyo, Japan.

*Primary Examiner* — Nathaniel R Pelton
(74) *Attorney, Agent, or Firm* — Buchalter LLP

(57) ABSTRACT

A method for controlling a power supply system 30 of a vehicle 10 that includes: a first step of permitting or prohibiting, based on a combination of normality and abnormality of the respective energy storage apparatuses 50, each of the energy storage apparatuses 50 to cut off supply of current such that the current cut-off device 53 of at least one of the energy storage apparatuses is brought into an energized state; and a second step of bringing the current cut-off device 53 into a cut-off state when a BMU 100 of the energy storage apparatus 50 that is permitted to cut off the current detects an abnormality of the energy storage apparatus 50 at a point of time that the cut-off of the supply of current is permitted, or when the BMU 100 detects an abnormality of the energy storage apparatus 50 after the cut-off of the supply of current is permitted.

8 Claims, 15 Drawing Sheets

(51) Int. Cl.

| | |
|---|---|
| *B60L 3/04* | (2006.01) |
| *H01M 10/42* | (2006.01) |
| *H01M 10/48* | (2006.01) |
| *H01M 50/512* | (2021.01) |
| *H01M 50/574* | (2021.01) |
| *H02H 7/18* | (2006.01) |
| *H02J 7/61* | (2026.01) |

(52) U.S. Cl.

CPC ......... *H01M 10/48* (2013.01); *H01M 50/512* (2021.01); *H01M 50/574* (2021.01); *H02J 7/61* (2026.01); *H02J 7/80* (2026.01); *H01M 2010/4271* (2013.01); *H01M 2200/00* (2013.01); *H01M 2220/20* (2013.01)

(58) Field of Classification Search

USPC ......................................................... 320/134
See application file for complete search history.

(56) References Cited

U.S. PATENT DOCUMENTS

| | | | |
|---|---|---|---|
| 2019/0288345 A1* | 9/2019 | Hinterberger ....... | H01M 10/425 |
| 2020/0064899 A1* | 2/2020 | Obie ................... | H01M 10/425 |
| 2021/0094441 A1* | 4/2021 | Sampson ................ | B60K 1/02 |
| 2022/0048391 A1 | 2/2022 | Shiraishi | |

FOREIGN PATENT DOCUMENTS

| | | | |
|---|---|---|---|
| JP | 2016-086506 | A | 5/2016 |
| JP | 2017-051036 | A | 3/2017 |
| JP | 2017-163749 | A | 9/2017 |
| JP | 2017-175730 | A | 9/2017 |
| JP | 2018-166380 | A | 10/2018 |
| WO | WO-2020/059732 | A1 | 3/2020 |

* cited by examiner

METHOD FOR CONTROLLING POWER SUPPLY SYSTEM OF MOBILE BODY, POWER SUPPLY SYSTEM OF MOBILE BODY, AND ENERGY STORAGE APPARATUS

CROSS REFERENCE TO RELATED APPLICATIONS

This application is a National Stage Application, filed under 35 U.S.C. § 371, of International Application No. PCT/JP2021/012109, filed Mar. 24, 2021, which claims priority to Japanese Application No. 2020-068793, filed Apr. 7, 2020; the contents of both of which as are hereby incorporated by reference in their entireties.

BACKGROUND

Related Field

The present invention relates to a method for controlling a power supply system of a mobile body, a power supply system of a mobile body, and an energy storage apparatus.

Description of Related Art

Currently, the vigorous development of automatic brake systems and automatic driving techniques has been underway in respective vehicle manufacturers. Such a flow of electrification of vehicles (mobile bodies) further increases the importance of a power supply system of a vehicle. As a power supply system of a vehicle, the power supply realized by one energy storage apparatus and an alternator is the mainstream still now. When a defect suddenly occurs in an energy storage apparatus or when a harness that is connected to an external terminal of an energy storage apparatus is disconnected, there is a case where the power supply to a vehicle is cut off. Therefore, it has been required to provide redundancy to a power supply system by connecting two energy storage apparatuses in parallel. Patent Document JP-A-2015-67042 describes a vehicle-use power supply device that includes a control device, an electric load, a main relay, a starter, an alternator, a lead-acid battery, a nickel-metal hydride rechargeable battery, and the like.

BRIEF SUMMARY

In order to ensure safety, an energy storage apparatus may include a current cut-off device that cuts off the supply of current when an abnormality such as an overcharge occurs. For example, in a power supply system in which two energy storage apparatuses are connected in parallel, when one of two energy storage apparatuses becomes abnormal, the other energy storage apparatus can continue the power supply to a vehicle even in a state where the supply of current from one power energy storage apparatus is cut off.

However, in a case where a current is cut off at a point of time that the other energy storage apparatus becomes abnormal, both two energy storage apparatuses are brought into a cut-off state and hence, power is not supplied to the mobile body load. Accordingly, there is room for improvement in reducing such a risk that power is not supplied to the mobile body load.

The present specification discloses a technique capable of reducing a risk that power is not supplied to a mobile body load even if all of a plurality of energy storage apparatuses connected in parallel become abnormal.

Provided is a method for controlling a power supply system of a mobile body where the power supply system includes a plurality of energy storage apparatuses that are connected to a mobile body load and are connected in parallel to each other, and the energy storage apparatus includes an energy storage device, a current cut-off device that is connected to the energy storage device in series, and a management device, the control method including: a first step of permitting or prohibiting, based on a combination of normality and abnormality of the respective energy storage apparatuses, each of the energy storage apparatuses to cut off supply of current such that the current cut-off device of at least one of the energy storage apparatuses is brought into an energized state; and a second step of bringing the current cut-off device into a cut-off state when the management device of the energy storage apparatus, which is permitted to cut off the current, detects an abnormality of the energy storage apparatus at a point of time that the cut-off of the supply of current is permitted, or when the management device detects an abnormality of the energy storage apparatus after the cut-off of the current is permitted.

The present invention reduces a risk that power is not supplied to a mobile body load even if all of a plurality of energy storage apparatuses connected in parallel become abnormal.

BRIEF DESCRIPTION OF THE FIGURES

FIG. 10 is a sequence of control processing of the power supply system.

FIG. 11 is a sequence of control processing of the power supply system according to a second embodiment.

FIG. 12 is a sequence of control processing of the power supply system.

DETAILED DESCRIPTION OF VARIOUS EMBODIMENTS

Figure 1:
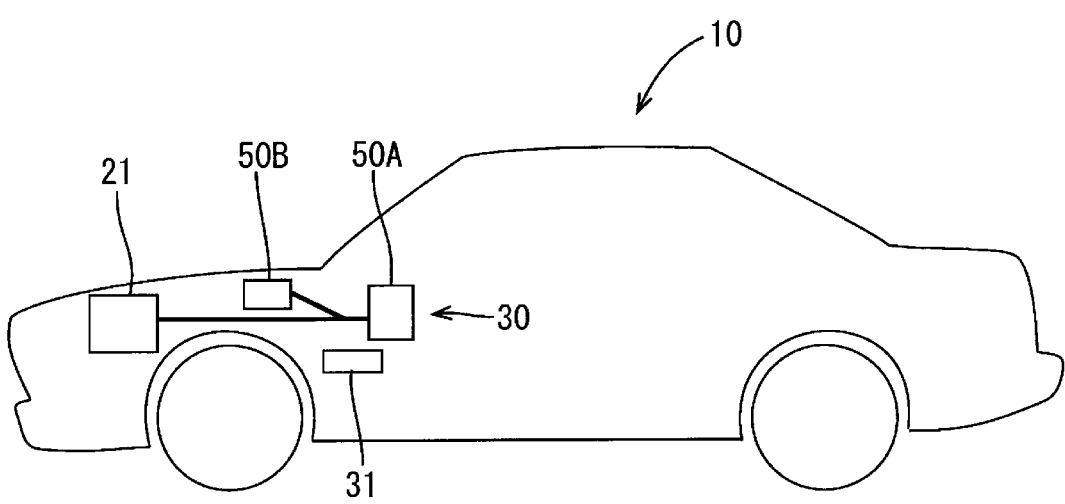
FIG. 1 is a schematic view of a vehicle according to a first embodiment.

Overall Configuration of Embodiments (1) Provided is a method for controlling a power supply system of a mobile body where the power supply system includes a plurality of energy storage apparatuses that are connected to a mobile body load and are connected in parallel to each other, and the energy storage apparatus includes an energy storage device, a current cut-off device that is connected to the energy storage device in series, and a management device, the control method including: a first step of permitting or prohibiting, based on a combination of normality and abnormality of the respective energy storage apparatuses, each of the energy storage apparatuses to cut off supply of current such that the current cut-off device of at least one of the energy storage apparatuses is brought into an energized state; and a second step of bringing the current cut-off device into a cut-off state when the management device of the energy storage apparatus, which is permitted to cut off the current, detects an abnormality of the energy storage apparatus at a point of time that the cut-off of the supply of current is permitted, or when the management device detects an abnormality of the energy storage apparatus after the cut-off of the current is permitted.

The "abnormality" described above is not limited to a case where the energy storage apparatus has already reached an abnormality, and includes a case where the energy storage apparatus is expected to reach an abnormality.

The above control method is an idea created by reversing a conventional idea of securing the safety of the energy storage apparatus by the current cut-off. That is, in the above control method, the cut-off of the supply of current is permitted or prohibited for each energy storage apparatus so that the current cut-off device of at least one energy storage apparatus is brought into an energized state based on the combination of the normality and the abnormality of respective energy storage apparatuses, and the current cut-off device is brought into a cut-off state when the management device of the energy storage apparatus that is permitted to cut off the supply of current detects an abnormality of the energy storage apparatus at a point of time that the cut-off of the supply of current is permitted or when an abnormality of the energy storage apparatus is detected after the cut-off of the supply of current is permitted. The current cut-off device of the energy storage apparatus that is permitted to cut off the supply of current is brought into a cut-off state and hence, it is possible to protect the energy storage apparatus that is permitted to cut off the supply of current from abnormality. Even if all energy storage apparatus become abnormal, at least one energy storage apparatus is in a state where the energy storage apparatus is connected to the mobile body. Accordingly, it is possible to reduce a risk that power is not supplied to the mobile body load as compared with a case where none of the energy storage apparatuses is connected to the mobile body.

(2) The abnormality of the energy storage apparatus described above may include an abnormality of the management device.

The abnormality of the energy storage apparatus includes an abnormality of the energy storage device and an abnormality of the management device. When the management device becomes abnormal, the state of the energy storage apparatus cannot be correctly detected. As a result, there is a possibility that, even though the energy storage apparatus is not abnormal, it is determined that the energy storage apparatus is abnormal, and the supply of current is cut off. For this reason, in a conventional power supply system that includes only one energy storage apparatus, when an abnormality occurs in a management device, the cut-off of supply of current is prohibited thus reducing a risk that the power is not supplied to a mobile body load. However, when the cut-off of the current is prohibited, even if an abnormality occurs in the energy storage device after such prohibition of the supply of the current, the supply of the current is not interrupted and hence, there is a possibility that the safety of the energy storage apparatus cannot be secured.

The inventor of the present application have made the following finding. In a power supply system having redundancy, even if an abnormality occurs in a management device of a certain energy storage apparatus, when there exists another normal energy storage apparatus, the supply of current of the energy storage apparatus in which an abnormality occurs in a management device is cut off. With such processing, it is possible to ensure safety of the energy storage apparatus in which the abnormality occurs in the management device while reducing a risk that power is not supplied to a mobile body load.

According to the above control method, when an abnormality occurs in a management device of a certain energy storage apparatus, if there exists another normal energy storage apparatus, the cut-off of the supply of current is permitted with respect to the energy storage apparatus in which the abnormality occurs in the management device, and the cut-off of the supply of current is prohibited with respect to the normal energy storage apparatus. Therefore, the safety of the energy storage apparatus in which the abnormality occurs in the management device can be secured while reducing a risk that power is not supplied to a mobile body load.

(3) The abnormality of the energy storage apparatus described above may be an abnormality of the management device.

The inventor of the present application have made the following finding. In a power supply system having redundancy, even if an abnormality occurs in a management device of a certain energy storage apparatus, when there exists another energy storage apparatus in which a management device is normal, the supply of current of the energy storage apparatus in which an abnormality occurs in a management device is cut off. With such processing, it is possible to ensure safety of the energy storage apparatus in which the abnormality occurs in the management device while reducing a risk that power is not supplied to a mobile body load.

According to the above control method, when an abnormality occurs in a management device of a certain energy storage apparatus, if there exists another energy storage apparatus in which a management device is normal, the cut-off of the supply of current is permitted with respect to the energy storage apparatus in which the abnormality occurs in the management device, and the cut-off of the supply of current is prohibited with respect to the energy storage apparatus in which the management is normal. Therefore, the safety of the energy storage apparatus in which the abnormality occurs in the management device can be secured while reducing a risk that power is not supplied to a mobile body load.

(4) The first step may include: a step of prohibiting the cut-off of the supply of current with respect to each of the energy storage apparatuses when all the energy storage apparatuses are normal, a step of requesting permission to cut off the supply of current when the management device of the energy storage apparatus detects the abnormality of the energy storage apparatus; and a step of permitting or prohibiting the cut-off of the supply of current with respect to the energy storage apparatus that has requested the permission to cut off of the supply of current such that the current cut-off device of at least one of the energy storage apparatuses is brought into an energized state based on a combination of the normality and the abnormality of the respective energy storage apparatuses when the permission to cut off of the supply of current is requested by the management device.

As a configuration of the power supply system of the mobile body, it may be possible to consider a configuration where a control unit that the mobile body includes and the energy storage apparatus are communicably connected to each other, and the control unit permits or prohibits cutoff of the supply of current with respect to the energy storage apparatuses. As a control method in such a case, it may be possible to consider a configuration where the control unit permits each of the energy storage apparatuses to cut off of the supply of current when all energy storage apparatuses are normal, and the management device cuts off the supply of current when the energy storage apparatus becomes abnormal. However, in such a control method, in a case where the communication between the control unit and the energy storage apparatus is cut off due to the occurrence of some sort of failure, the cut-off of the supply of current to the energy storage apparatus cannot be prohibited even in a situation where the cut-off of the supply of current should be prohibited. Accordingly, there is a possibility that a current is cut off so that power is not supplied to a mobile body load.

According to the above control method, when all the energy storage apparatuses are normal, the cut-off of the supply of current is prohibited with respect to each energy storage apparatus. With such a configuration, in a case where the communication between the control unit and the energy storage apparatus is terminated, even if an abnormality occurs in the energy storage apparatus, the control unit does not permit the cut-off of the supply of current. Accordingly, the energy storage apparatus remains prohibited from cutting off the supply of current. Accordingly, even when the communication between the control unit and the energy storage apparatus is terminated, it is possible to reduce a risk that power is not supplied to a mobile body load. The above control method is particularly useful in the case of a power supply system where it is strongly required to reduce a risk that power is not supplied to a mobile body load.

Here, the case has been exemplified where the control unit that the mobile body includes permits or prohibits cutting off the supply of current with respect to the respective energy storage apparatuses. However, a management device of any one energy storage apparatus among the plurality of energy storage apparatuses may be configured to function as the above-described control unit.

(5) The first step may include a step of permitting all the energy storage apparatuses to cut off of the supply of current when two or more energy storage apparatuses are normal, and a step of prohibiting the cut-off of the supply of current to the normal energy storage apparatus when the number of normal energy storage apparatuses is one.

According to the above control method, when the number of normal energy storage apparatuses is two or more, the cut-off of the supply of current is permitted with respect to all energy storage apparatuses. Accordingly, a current is cut off in the case of an abnormal energy storage apparatus, and a current is cut off when a normal energy storage apparatus becomes abnormal thereafter in case of the normal energy storage apparatus. Accordingly, the safety of the energy storage apparatus can be ensured.

For example, assuming that two energy storage apparatuses are normal and one of the energy storage apparatuses becomes abnormal later, there is only one normal energy storage apparatus. When there is only one normal energy storage apparatus, the cut-off of the supply of current is prohibited with respect to the energy storage apparatus and hence, a risk that power is not supplied to a mobile body load can be reduced.

(6) In the first step, when all energy storage apparatuses are abnormal, the cut-off of the supply of current may be prohibited with respect to two or more energy storage apparatuses.

When all energy storage apparatuses become abnormal, a risk that power is not supplied to a mobile body load can be prevented by prohibiting the cut-off of the supply of current with respect to at least one energy storage apparatus. However, when the cut-off of the supply of a current is prohibited, the energy storage apparatus may be overcharged by a charge current supplied from an alternator thereafter and hence, there is a possibility that the battery performance is lost. The loss of battery performance means that neither charging nor discharging by the energy storage apparatus is possible.

When the battery performance of all energy storage apparatuses is lost, power is not supplied to a mobile body load. When power is not supplied to a mobile body load while a mobile body is traveling, power is not supplied to a control unit of a power supply system, a brake system, a power steering, and the like. Accordingly, there is a possibility that the mobile body cannot be safely stopped. When power is not supplied to a mobile body load, a hazard lamp also cannot be turned on. Therefore, even when all energy storage apparatuses become abnormal, it is desirable to secure a time until the mobile body can be safely stopped.

According to the above control method, when all energy storage apparatuses become abnormal, the cut-off of the supply of current is prohibited with respect to two or more energy storage apparatuses. Accordingly, a charge current can be shared and received by two or more energy storage apparatuses. When a charge current is shared and received by two or more energy storage apparatuses, as compared with a case where the charge current is received by only one energy storage apparatus, the rise of a voltage of each energy storage apparatus becomes slow so that the time until the energy storage apparatus is overcharged (in other words, the time until the battery performance is lost) is prolonged. Therefore, it is possible to secure a time during which the mobile body can safely stop.

(7) In the first step, when all energy storage apparatuses are abnormal, the energy storage apparatuses to which the prohibition of the cut-off of the supply of current is applied may be determined based on types of abnormalities of the above-mentioned respective energy storage apparatuses.

When the energy storage apparatus becomes abnormal, when the cut-off of the supply of current to the energy storage apparatus is kept prohibited, there is a possibility that the energy storage apparatus becomes completely unusable. However, the possibility that the energy storage apparatus becomes completely unusable varies depending on the type of abnormality.

According to the above-mentioned control method, the energy storage apparatuses to which the prohibition of the cut-off of the supply of current is applied is determined based on the type of the abnormality. Accordingly, a possibility that the energy storage apparatus becomes completely unusable can be reduced as compared with a case where the determination is made regardless of a type of abnormality.

(8) In the above-mentioned first step, there may be a case where, assuming that there are two or more energy storage apparatuses are normal, and any one of the energy storage apparatuses becomes abnormal among these energy storage apparatuses so that the current cut-off device of the energy storage apparatus is brought into a cut-off state, a sum of remaining amounts of power of other normal energy storage apparatuses becomes less than an amount of power required by the power supply system. In such a case, the cut-off of the supply of current may be prohibited with respect to all normal energy storage apparatuses.

It is assumed that the amount of power required by the power supply system is 100. It is assumed that there are a normal energy storage apparatus A and a normal energy storage apparatus B, a remaining amount of power of the energy storage apparatus A is 70, and a remaining amount of power of the energy storage apparatus B is 60. In this case, the sum of the remaining amount of power of the energy storage apparatus A and the remaining amount of power of the energy storage apparatus B is 130. Accordingly, the sum of the remaining amounts of power is equal to or more than the amount of power (=100) required by the power supply system. In this case, for example, assuming that the energy storage apparatus A becomes abnormal, the normal energy storage apparatus is only the energy storage apparatus B and hence, the sum of the remaining amounts of powers of the other normal energy storage apparatuses is 60, which is less than the amount of power required by the power supply system.

According to the above-mentioned method, in the case where, assuming that any one of the energy storage apparatuses becomes abnormal among the normal energy storage apparatuses so that the current cut-off device of the energy storage apparatus is brought into a cut-off state, a sum of remaining amounts of power of other normal energy storage apparatuses becomes less than an amount of power required by the power supply system, the cut-off of the supply of current may be prohibited with respect to all normal energy storage apparatuses. Accordingly, even if any energy storage apparatus becomes abnormal, an amount of power necessary for the power supply system can be ensured. As a result, it is possible to more reliably reduce a risk that power is not supplied to a mobile body load.

(9) Provided is a power supply system of a mobile body that includes: a plurality of energy storage apparatuses that are connected to a mobile body load and are connected in parallel to each other; and a control unit, wherein the energy storage apparatus includes an energy storage device, a current cut-off device that is connected to the energy storage device in series, and a management device, the control unit executes: first processing of permitting or prohibiting cut-off of supply of current with respect to the respective energy storage apparatuses based on a combination of normality and abnormality of the respective energy storage apparatuses such that the current cut-off device of at least one of the energy storage apparatuses is brought into an energized state; and second processing of bringing the current cut-off device into a cut-off state when the management device of the energy storage apparatus, which is permitted to cut off the current, detects abnormality of the energy storage apparatus at a point of time that the cut-off of the current is permitted, or when the management device detects an abnormality of the energy storage apparatus after the cut-off of the current is permitted.

According to the above-mentioned power supply system, it is possible to reduce a risk that power is not supplied to a mobile body load even if all of a plurality of energy storage apparatuses connected in parallel become abnormal.

(10) Provided is a power supply system of a mobile body that includes: a plurality of energy storage apparatuses that are connected to a mobile body load and are connected in parallel to each other, wherein the energy storage apparatus includes an energy storage device, a current cut-off device that is connected to the energy storage device in series, and a management device, the management device of any one of the energy storage apparatus executes: first processing of permitting or prohibiting cut-off of supply of current with respect to the respective energy storage apparatuses based on a combination of normality and abnormality of the respective energy storage apparatuses such that the current cut-off device of at least one of the energy storage apparatuses is brought into an energized state; and also executes second processing of bringing the current cut-off device into a cut-off state when the management device of the energy storage apparatus, which is permitted to cut off the current, detects an abnormality of the energy storage apparatus at a point of time that the cut-off of the supply of current is permitted, or when the management device detects an abnormality of the energy storage apparatus after the cut-off of the supply of current is permitted.

According to the above-mentioned power supply system, it is possible to reduce a risk that power is not supplied to a mobile body load even if all of a plurality of energy storage apparatuses connected in parallel become abnormal.

(11) An energy storage apparatus used in a power supply system of a mobile body, the energy storage apparatus including: an energy storage device; a current cut-off device that is connected in series with the energy storage device; and a management device, wherein the management device executes: third processing of detecting normality and abnormality of the energy storage device and transmitting a detection result of the normality or the abnormality to an external device; fourth processing of receiving a permission signal permitting cut-off of the supply of current or a prohibition signal that prohibits cut-off of the supply of current from the external device; and second processing of bringing the cut-off device into a cut-off state in a case where the abnormality of the energy storage apparatus is detected at a point of time that the permission signal is received or in a case where the abnormality of the energy storage apparatus is detected after the permission signal is received.

According to the above-mentioned energy storage apparatus, it is possible to reduce a risk that power is not supplied to a mobile body load even if all of a plurality of energy storage apparatuses connected in parallel become abnormal.

The invention disclosed in the present specification can be implemented in various modes such as an apparatus, a method, a computer program for implementing the functions of the apparatus or the method, and a recording medium recording the computer program.

First Embodiment

A first embodiment will be described with reference to FIG. 1 to FIG. 10. In the description made hereinafter, reference numerals used in the drawings may be omitted with respect to the same constituent elements except for some constituent elements.

(1-1) Power Supply System of Vehicle

A vehicle 10 (an example of a mobile body) illustrated in FIG. 1 having a vehicle-use power supply system is an engine-driven vehicle, and an engine starter 21 such as a cell motor and a power supply system 30 are mounted on the vehicle 10.

Figure 2:
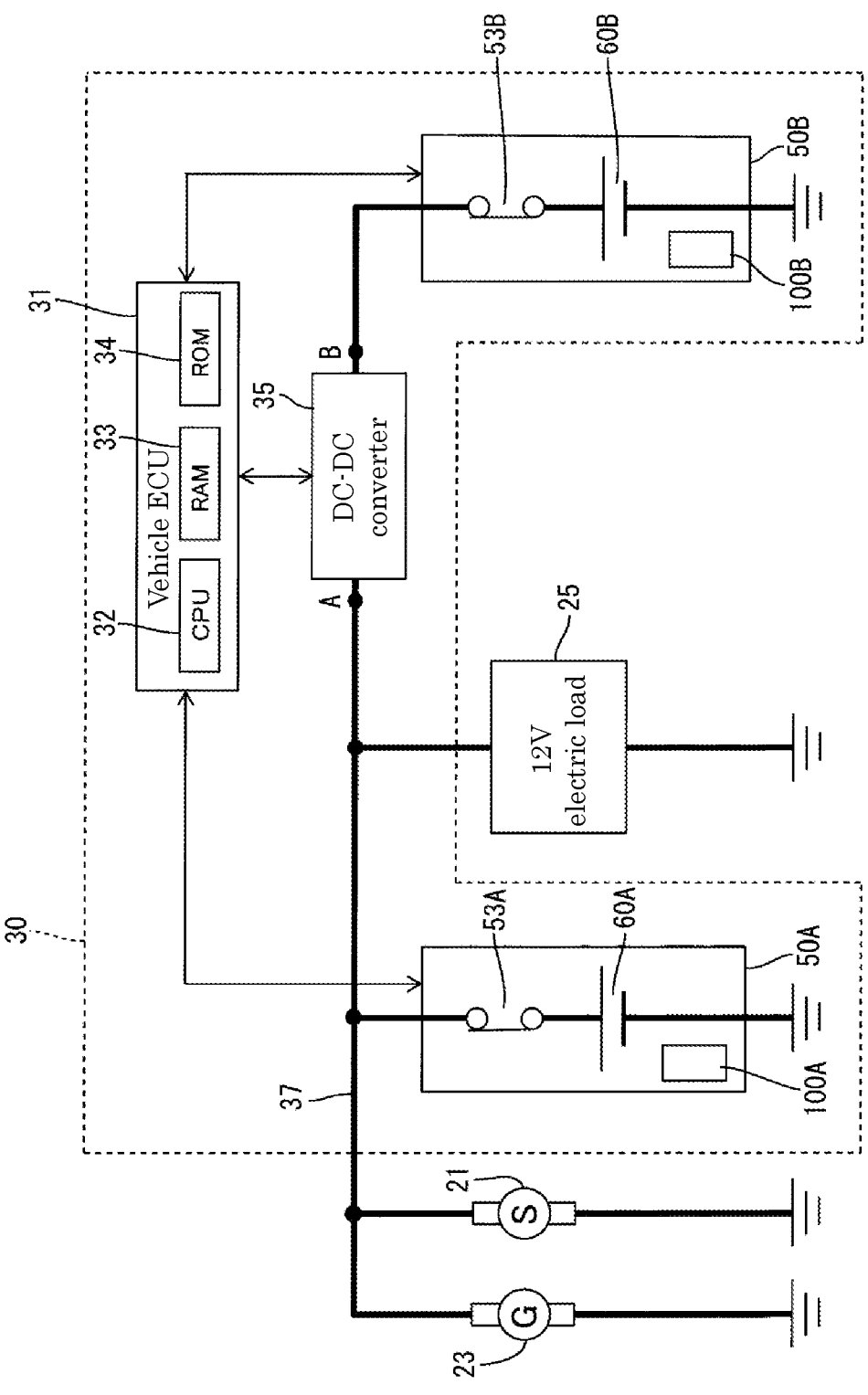
FIG. 2 is a block diagram of a power supply system.

As illustrated in FIG. 2, an alternator 23 that is a vehicle generator, an electric load 25, and the like are also mounted on the vehicle 10. The electric load 25 has a rated voltage of 12 V, and as examples of the electric load 25, an air conditioner, an audio system, and a car navigation system and the like are named. The engine starter 21 and the electric load 25 are examples of mobile body loads.

The power supply system 30 includes a vehicle electronic control unit (ECU) 31, a first energy storage apparatus 50A (an example of an energy storage apparatus device), a second energy storage apparatus 50B (an example of an energy storage apparatus), and a DC-DC converter 35. In the description made hereinafter, when it is unnecessary to distinguish the first energy storage apparatus 50A and the second energy storage apparatus 50B from each other, they are simply referred to as the energy storage apparatus 50. The same goes for other constituent elements.

The vehicle ECU 31 (an example of a control unit and an external device) is a control unit of the power supply system 30. The vehicle ECU 31 is communicably connected to the first energy storage apparatus 50A, the second energy storage apparatus 50B, and the DC-DC converter 35. The vehicle ECU 31 includes a CPU 32, a RAM 33, a ROM 34, and the like. The ROM 34 stores various control programs executed by the CPU 32. The vehicle ECU 31 is activated, for example, when an ignition switch of the vehicle 10 is turned on or a start button is pressed. The vehicle ECU 31 may be constantly activated by power supplied from the first energy storage apparatus 50A or the second energy storage apparatus 50B even while the ignition switch is turned off.

The vehicle ECU 31 performs a charge/discharge control of the energy storage apparatus 50 by controlling the DC-DC converter 35. The vehicle ECU 31 can obtain information on an operating state of the engine and a traveling state of the vehicle 10 from another ECU that controls the engine (driving device) of the vehicle 10. As will be described in detail later, the vehicle ECU 31 receives a state of the energy storage apparatus 50 (normal, abnormal) at a constant cycle, and executes processing of permitting or prohibiting the cut-off of the supply of current with respect to respective energy storage apparatuses 50 so that at least one energy storage apparatus 50 is brought into an energized state based on a combination of the normality and the abnormality of the respective energy storage apparatuses 50.

The first energy storage apparatus 50A is connected to a power line 37. The engine starter 21, the alternator 23, and the electric load 25 are connected to the first energy storage apparatus 50A via the power line 37. The first energy storage apparatus 50A includes a first current cut-off device 53A (an example of current cut-off device), a first assembled battery 60A, and a first battery management unit (BMU) 100A. The first energy storage apparatus 50A has a rated voltage of 12 V. The first BMU 100A is an example of a management device.

The second energy storage apparatus 50B is communicably connected to the first energy storage apparatus 50A via the DC-DC converter 35 in parallel. The second energy storage apparatus 50B includes a second current cut-off device 53B (an example of current cut-off device), a second assembled battery 60B, and a second BMU 100B. The second energy storage apparatus 50B has a rated voltage of 12 V. The second BMU 100B is an example of a management device.

The DC-DC converter 35 is a bidirectional DC-DC converter capable of controlling charging and discharging of the second energy storage apparatus 50B. The DC-DC converter 35 is regulator that controls charging and discharging of the second energy storage apparatus 50B. The regulator may be a part other than the DC-DC converter 35.

The DC-DC converter 35 can control power supply from the second energy storage apparatus 50B to the electric load 25 by controlling a voltage at a point A on a load side. By making a voltage at the point A higher than an output voltage of the alternator 23, power is supplied to the electric load 25. By making the voltage at the point A lower than the output voltage of the alternator 23, power supply to the electric load 25 can be stopped (discharge control).

The DC-DC converter 35 can control power supply to the second energy storage apparatus 50B by controlling a voltage at a point B on a second energy storage apparatus 50B side. By making a voltage at the point B higher than an output voltage of the second energy storage apparatus 50B, power is supplied to the second energy storage apparatus 50B from the alternator 23 via the power line 37. By making the voltage at the point B lower than an output voltage of the second energy storage apparatus 50B, power supply to the second energy storage apparatus 50B can be stopped (charge control).

By connecting two energy storage apparatuses 50 in parallel, even when an abnormality occurs in one energy storage apparatus 50 (for example, the first energy storage apparatus 50A: the main energy storage apparatus), the other energy storage apparatus 50 (for example, second energy storage apparatus 50B: sub energy storage apparatus) can continue power supply to the vehicle 10, and the power supply of the vehicle 10 can be made redundant.

(1-2) Configuration of Energy Storage Apparatus

Figure 3:
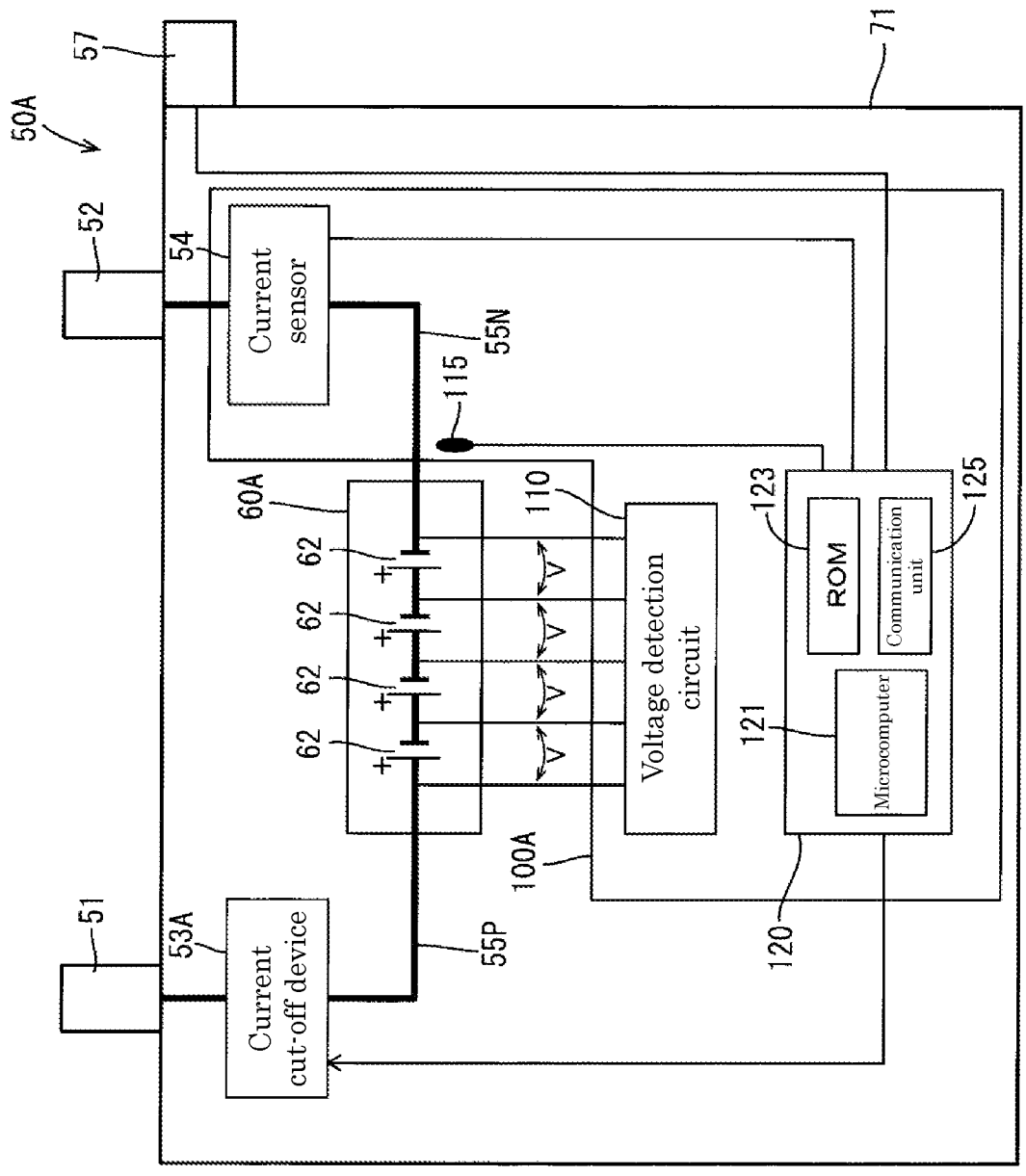
FIG. 3 is a block diagram of a first energy storage apparatus.

As illustrated in FIG. 3, the first energy storage apparatus 50A includes the first assembled battery 60A, a first current cut-off device 53A that is connected in series with the first assembled battery 60A, a first BMU 100A, and a connector 57.

As will be described in detail later, the first BMU 100A includes a current sensor 54. The first current cut-off device 53A, the first assembled battery 60A and the current sensor 54 are connected in series via power lines 55P, 55N. The power line 55P is a power line that connects an external terminal 51 of a positive electrode and a positive electrode of the first assembled battery 60A. The power line 55N is a power line that connects an external terminal 52 of the negative electrode and a negative electrode of the first assembled battery 60A. The first current cut-off device 53A is positioned on a positive electrode side of the first assembled battery 60A, and is disposed on the power line 55P on a positive electrode side. The current sensor 54 is positioned on a negative electrode side of the first assembled battery 60A, and is disposed on the power line 55N of a negative electrode.

In the first assembled battery 60A, twelve secondary batteries 62 (an example of energy storage devices) are connected in three parallel and in four series. In FIG. 3, three secondary batteries 62 that are connected in parallel are indicated by one battery symbol. The secondary battery 62 is, as an example, a lithium ion secondary battery.

The first current cut-off device 53A can be formed of a contact switch (mechanical) such as a relay or a semiconductor switch such as an FET or a transistor. The first current cut-off device 53A is switched between a cut-off state and an energized state (an opened state and a closed state, an open state and a closed state, an off state and an on state) by a first BMU 100A. When the first current cut-off device 53A is brought into a cut-off state, the first energy storage apparatus 50A is disconnected from the power line 37 of the vehicle 10 and hence, and the supply of current is cut off. When the first current cut-off device 53A is brought into an energized state, the first energy storage apparatus 50A is connected to the power line 37 and hence, power can be supplied to the vehicle 10.

The first BMU 100A includes the current sensor 54, a voltage detection circuit 110, a temperature sensor 115, a management unit 120, and the like. The voltage detection circuit 110 and the management unit 120 are mounted on a circuit board unit 65 (see FIG. 4).

The current sensor 54 measures a charge/discharge current [A] of the first assembled battery 60A and outputs the measured charge/discharge current to the management unit 120.

The voltage detection circuit 110 is connected to both ends of each secondary battery 62 by signal lines. The voltage detection circuit 110 measures battery voltages [V] of the respective secondary batteries 62 and outputs the measured battery voltages [V] to the management unit 120. A total voltage [V] of the first assembled battery 60A is a sum of voltages of four secondary batteries 62 connected in series.

The temperature sensor 115 is a contact type sensor or a non-contact type sensor. The temperature sensor 115 measures temperatures [° C.] of the secondary batteries 62, and outputs the measured temperatures to the management unit 120. Although not illustrated in FIG. 3, two or more temperature sensors 115 are provided. The respective temperature sensors 115 detect temperatures of the different secondary batteries 62.

The management unit 120 includes: a microcomputer 121 in which a CPU, a RAM, and the like are integrated into one chip; a ROM 123; and a communication unit 125. The ROM 123 stores various programs and various data. The microcomputer 121 manages the first energy storage apparatus 50A by executing a program stored in the ROM 123.

The first connector 57 is a connector to which a communication cable for communicably connecting the first energy storage apparatus 50A to the vehicle ECU 31 is connected.

Figure 4:
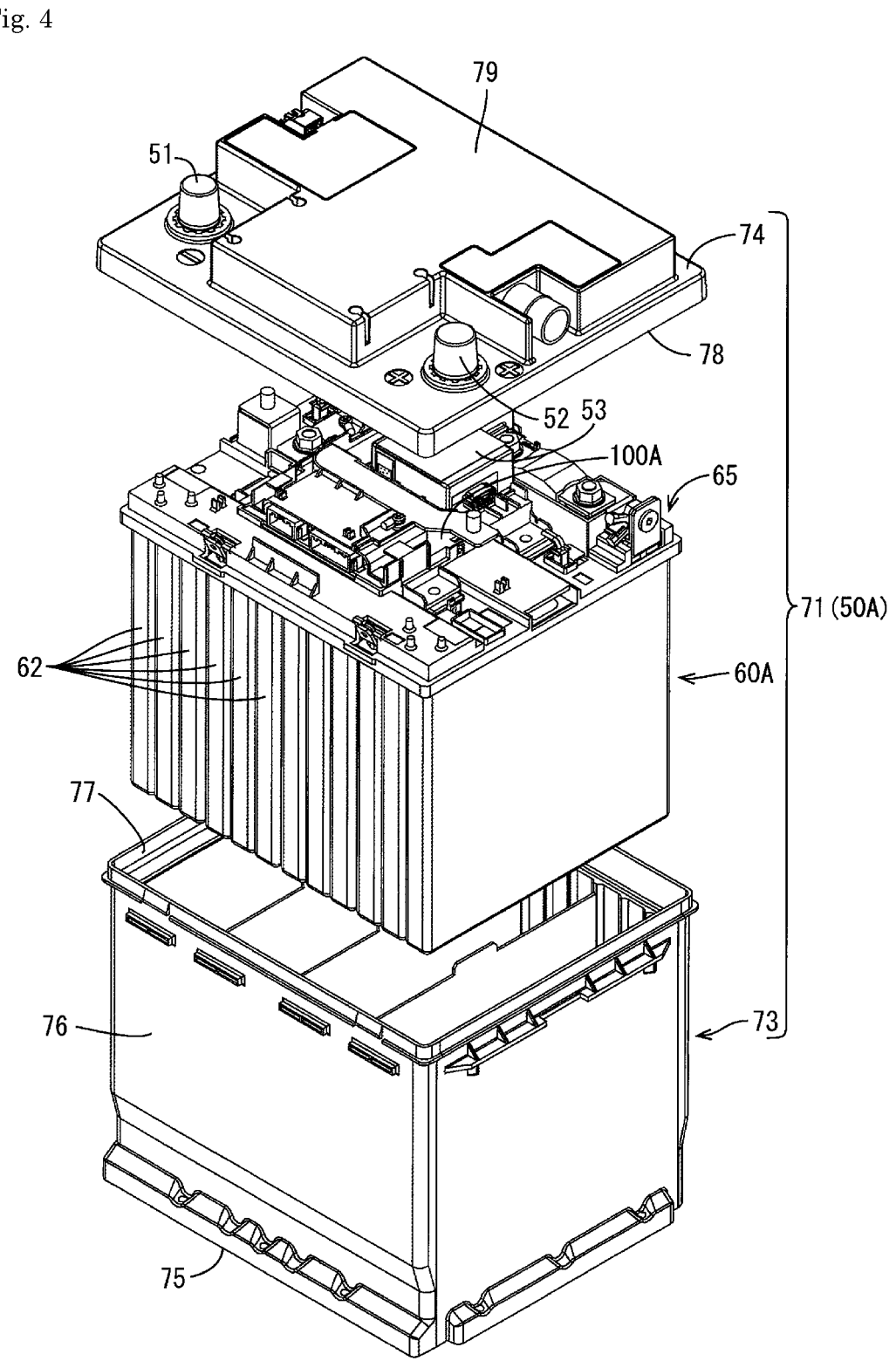
FIG. 4 is an exploded perspective view of the energy storage apparatus.

As illustrated in FIG. 4, the first energy storage apparatus 50A includes a housing 71. The housing 71 includes a body 73 made of a synthetic resin material and a lid body 74. The body 73 has a bottomed cylindrical shape. The body 73 includes a bottom surface portion 75 and four side surface portions 76. An upper opening portion 77 is formed at an upper end portion of the body 73 by four side surface portions 76.

The housing 71 houses the first assembled battery 60A and the circuit board unit 65. The circuit board unit 65 is disposed above the first assembled battery 60A.

The lid body 74 closes the upper opening portion 77 of the body 73. An outer peripheral wall 78 is formed on a periphery of the lid body 74. The lid body 74 has a protrusion 79 having substantially a T-shape in a plan view. The external terminal 51 of the positive electrode is fixed to one corner portion of a front portion of the lid body 74, and the external terminal 52 of the negative electrode is fixed to the other corner portion of the front portion of the lid body 74.

Figure 5A:
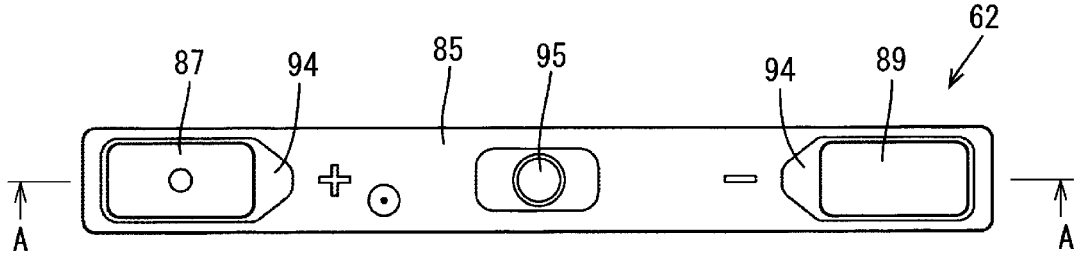
FIG. 5A is a plan view of a secondary battery.
Figure 5B:
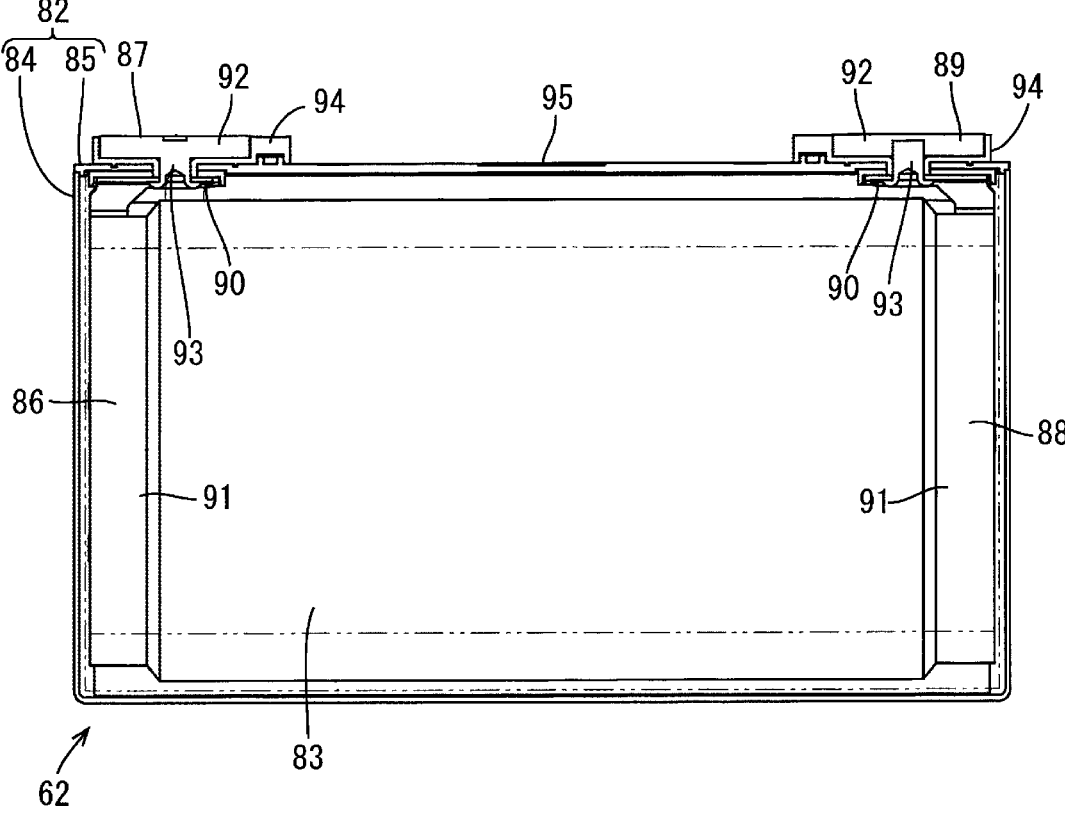
FIG. 5B is a cross-sectional view taken along line A-A of FIG. 5A.

As illustrated in FIG. 5A and FIG. 5B, the secondary battery 62 is formed by accommodating an electrode assembly 83 in a rectangular parallelepiped case 82 together with a nonaqueous electrolyte. The case 82 includes a case body 84 and a lid 85 that closes an opening portion formed at an upper portion of the case body 84.

Although not illustrated in detail, the electrode assembly 83 is formed such that a separator formed of a porous resin film is disposed between a negative electrode element that is formed by applying an active material to a base material formed of a copper foil, and a positive electrode element that is formed by applying an active material to a base material formed of an aluminum foil. These elements all have a strip shape, and are wound in a flat shape so as to be accommodated in the case body 84 in a state where the position of the negative electrode element and the position of the positive electrode element are displaced toward opposite sides in the width direction with respect to the separator.

A positive electrode terminal 87 is connected to the positive electrode element via a positive electrode current collector 86, and a negative electrode terminal 89 is connected to the negative electrode element via a negative electrode current collector 88. The positive electrode current collector 86 and the negative electrode current collector 88 are each formed of a flat plate-like pedestal portion 90 and a leg portion 91 extending from the pedestal portion 90. A through hole is formed in the pedestal portion 90. The leg portion 91 is connected to the positive electrode element or the negative electrode element. The positive electrode terminal 87 and the negative electrode terminal 89 each include: a terminal body portion 92; and a shaft portion 93 protruding downward from a center portion of a lower surface of the terminal body portion 92. In such a configuration, the terminal body portion 92 and the shaft portion 93 of the positive electrode terminal 87 are integrally formed with each other using aluminum (a single material). In the negative electrode terminal 89, the terminal body portion 92 is made of aluminum, and the shaft portion 93 is made of copper. The negative electrode terminal 89 is formed by assembling the terminal body portion 92 and the shaft portion 93 to each other. The terminal body portion 92 of the positive electrode terminal 87 and the terminal body portion 92 of the negative electrode terminal 89 are disposed at both end portions of the lid 85 via gaskets 94 made of an insulating material. The terminal body portion 92 of the positive electrode terminal 87 and the terminal body portion 92 of the negative electrode terminal 89 are exposed outward from the gaskets 94.

The lid 85 has a pressure release valve 95. As illustrated in FIG. 5A, the pressure release valve 95 is positioned between the positive electrode terminal 87 and the negative electrode terminal 89. The pressure release valve 95 is released when an internal pressure in the case 82 exceeds a limit value so as to lower the internal pressure in the case 82.

Figure 6:
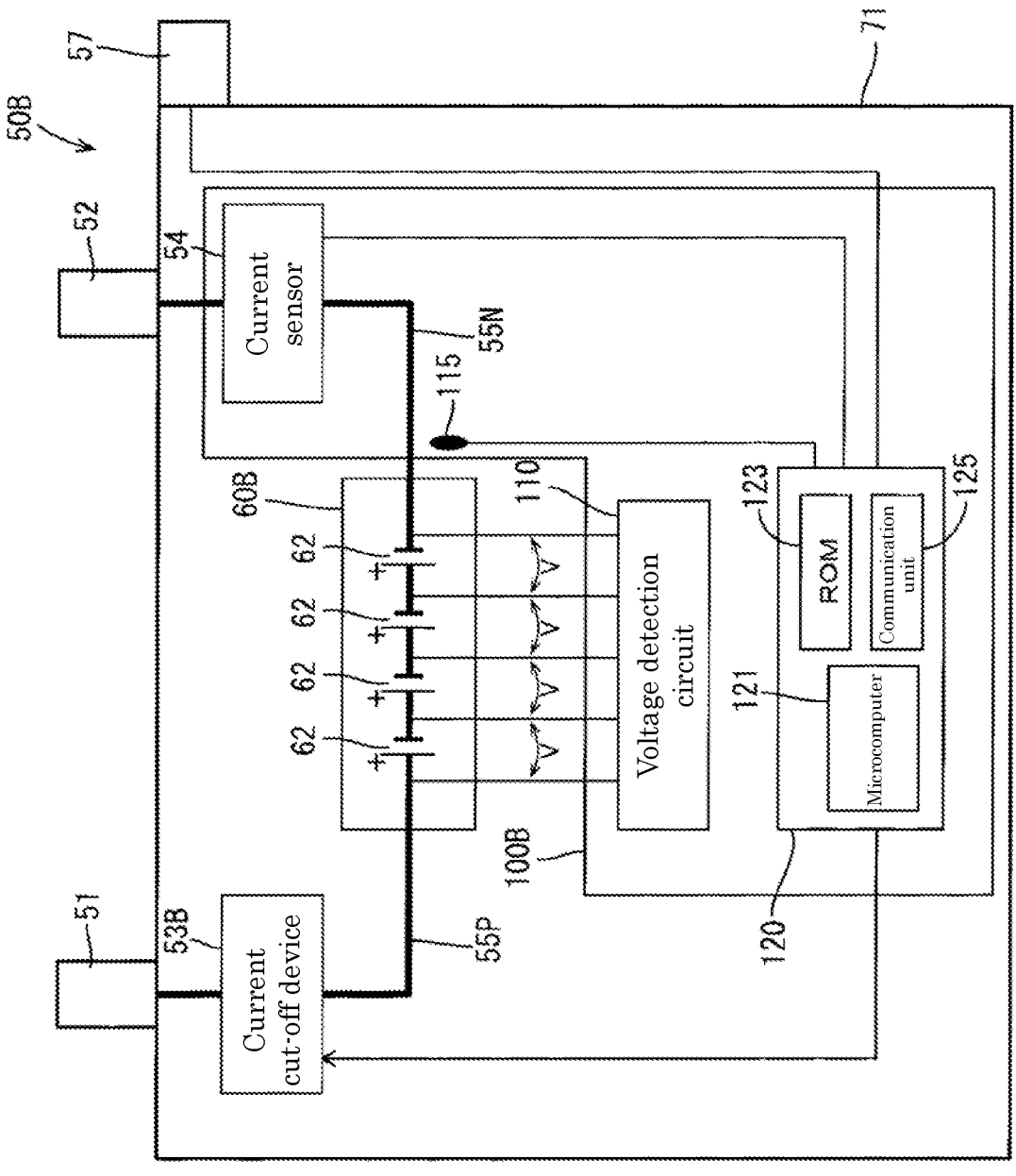
FIG. 6 is a block diagram of a second energy storage apparatus.

As illustrated in FIG. 6, the second energy storage apparatus 50B includes a second assembled battery 60B that is formed of a plurality of secondary batteries 62, a second current cut-off device 53B that is connected in series with the second assembled battery 60B, a second BMU 100B, and a connector 57. The structure of the second energy storage apparatus 50B is substantially the same as the structure of the first energy storage apparatus 50A and hence, the detailed description of the structure of the second energy storage apparatus 50B will be omitted.

(1-3) Charging Curve

Figure 7:
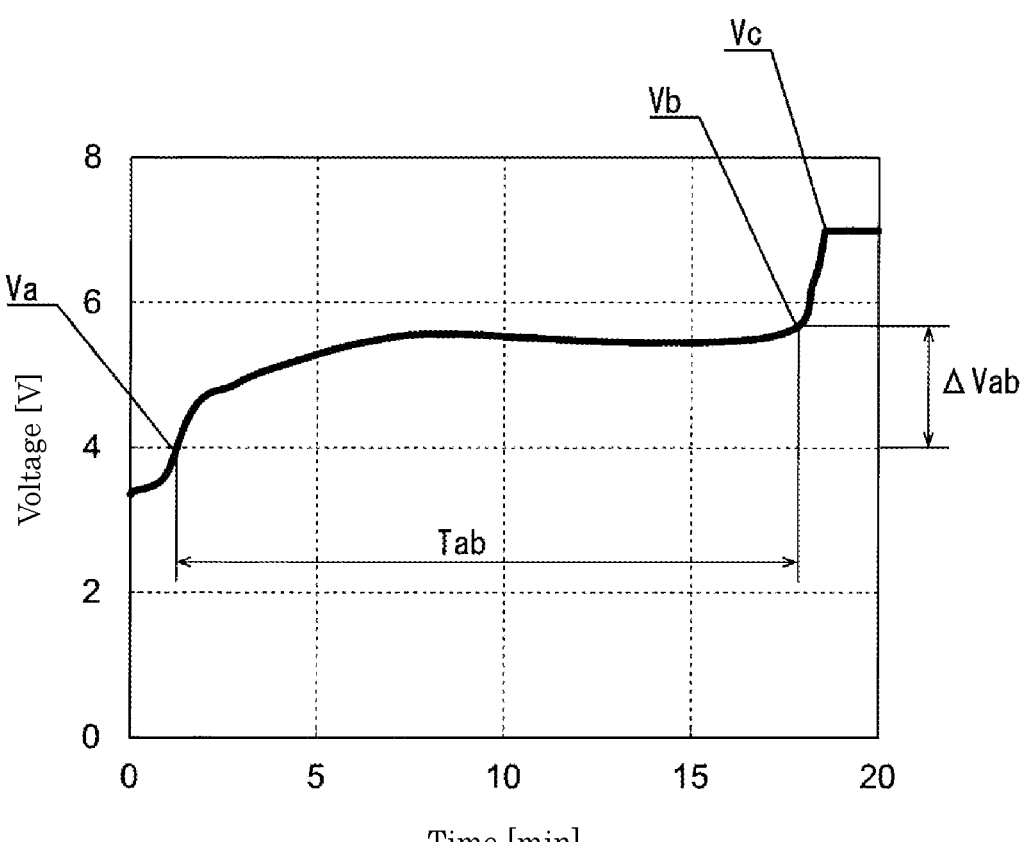
FIG. 7 is a graph illustrating a charging curve.

FIG. 7 is a graph illustrating a charging curve when the secondary battery 62 is charged at a predetermined rate. In the graph, time is taken on an axis of abscissas, and a voltage is taken on an axis of ordinate. Symbol Va indicates a threshold voltage (an upper limit voltage at which the secondary battery 62 can be safely used) at which the current cut-off device 53 is brought into a current cut-off state. The voltage Va is 4 V as an example. Symbol Vb indicates a limit voltage at which the secondary battery 62 loses its battery performance. The limit voltage Vb is 5.8 V as an example. The loss of battery performance means that neither charging nor discharging by the energy storage apparatus is possible. Symbol Vc indicates a voltage at which the pressure release valve 95 is operated. The voltage Vc is 7 V as an example.

(1-4) Method for Controlling Power Supply System

The BMU 100 (the first BMU 100A, the second BMU 100B) of each energy storage apparatus 50 (the first energy storage apparatus 50A, the second energy storage apparatus 50B) detects a state (normal, abnormal) of the energy storage apparatus 50 at a predetermined cycle (for example, 10 milliseconds), and transmits a state signal that indicates a detected state to the vehicle ECU 31. When the vehicle ECU 31 receives state signals from the respective BMUs 100, based on the combination of normality and abnormality of the respective energy storage apparatuses 50, the vehicle ECU 31 permits or prohibits the cut-off of an electric current with respect to the respective energy storage apparatuses 50 so that at least one energy storage apparatus 50 is brought into an energized state. The BMU 100 of the energy storage apparatus 50 that is permitted to cut off of the supply of current, when abnormality of the energy storage apparatus 50 is detected at a point of time that the cut-off of the supply of current is permitted, brings the current cut-off device 53 into a cut-off state so as to cut off of the supply of current. The above-mentioned processing is specifically described hereinafter.

(1-4-1) Detection of State of Energy Storage Apparatus

The detection of a state of the energy storage apparatus 50 means the detection of whether the energy storage apparatus 50 is normal or abnormal. The abnormality of the energy storage apparatus 50 includes an abnormality of the secondary battery 62 and an abnormality of the BMU 100. Hereinafter, the detection of the abnormality of the secondary battery 62 and the detection of the abnormality of the BMU 100 will be described.

(1-4-1-1) Detection of Abnormality of Secondary Battery

The abnormality of the secondary battery 62 is, specifically, overcharge, overdischarge, overcurrent, temperature abnormality, or the like.

The BMU 100 measures a current value at a constant cycle by the current sensor 54, and estimates a state of charge (SOC) by a current integration method. The current integration method is a method where an amount of power flowing in and out of the assembled battery is measured by constantly measuring the charge/discharge current of the assembled battery using the current sensor 54, and estimating the SOC by adding or subtracting the amount of power to and from an initial capacity. The BMU 100 determines that the battery is overcharged when the estimated SOC is larger than a predetermined upper limit value, and determines that the battery is overdischarged when the estimated SOC is smaller than a predetermined lower limit value. As a factor that causes the overcharge of the secondary battery 62, a failure in the alternator 23 can be exemplified.

In the above-mentioned processing, the case has been described where the overcharge or the overdischarge is determined based on the SOC estimated by the current integration method as an example. However, the overcharge or the overdischarge may be determined based on a voltage value measured by the voltage detection circuit 110. Specifically, there exists a relatively accurate correlation between an open circuit voltage (OCV) and an SOC of the energy storage apparatus 50. Accordingly, it may be determined as overcharge when a voltage measured by the voltage detection circuit 110 is equal to or higher than a predetermined upper limit voltage. On the other hand, it may be determined as overdischarge when a voltage measured by the voltage detection circuit 110 is equal to or lower than a predetermined lower limit voltage.

Each time a current value is measured by the current sensor 54, the BMU 100 determines whether or not the measured current value is a predetermined value or more, and determines that the measured current is an overcurrent when the measured current value is the predetermined value or more. As a factor that causes the overcharge of the secondary battery 62, a failure in the alternator 23 or external short-circuiting can be exemplified.

The BMU 100 measures temperatures of the secondary batteries 62 at a constant cycle by the temperature sensor 115, and determines that there is a temperature abnormality when the measured temperature is a predetermined value or more.

In the above-mentioned processing, the description has been made by taking the overcharge, the overdischarge, the overcurrent, and the temperature abnormality as examples of the abnormality of the secondary battery 62. However, the abnormality of the secondary battery 62 is not limited to these factors.

(1-4-1-2) Detection of Abnormality of BMU

Specifically, the abnormality of the BMU 100 is an abnormality of a component (the management unit 120, the current sensor 54, the voltage detection circuit 110, the temperature sensor 115, the communication unit 125, or the like) that forms a constituent element the BMU 100. For the sake of convenience, in the present embodiment, the current cut-off device 53 is not included in the constituent elements of the BMU 100. Accordingly, an abnormality of the current cut-off device 53 is not included in the abnormality of the BMU 100.

The BMU 100 detects the abnormality of the BMU 100 itself by performing a self-diagnosis at a predetermined cycle. Specifically, for example, in the detection of the abnormality of the management unit 120, the BMU 100 performs a cyclic redundancy check (CRC) of the ROM 34, and determines that the management unit 120 is abnormal when the detected value is different from a previously stored value.

The abnormality of the current sensor 54 can be detected by various methods. For example, two current sensors 54 may be provided, and the BMU 100 may determine that the current sensor 54 is abnormal when a difference between the detection results of these two current sensors 54 is a predetermined value or more. Alternatively, the abnormality of the current sensor 54 may be detected by providing a circuit for detecting the abnormality of the current sensor 54. The same goes for the voltage detection circuit 110.

In the detection of the abnormality of the temperature sensor 115, the BMU 100 detects the temperatures of the secondary batteries 62 by the plurality of temperature sensors 115, and the BMU 100 determines that the temperature sensor 115 is abnormal when a difference between the detection results is a predetermined value or more. In the detection of the abnormality of the communication unit 125, the BMU 100 counts the number of times that a communication error has occurred, and determines that the communication unit 125 is abnormal when the number of times that the communication error has occurred is a predetermined value or more.

The method of detecting the abnormality of the BMU 100 is not limited to the above-described method, and the abnormality of the BMU 100 can be detected by an appropriate method.

(1-4-2) Permission or Prohibition of Cut-Off of Supply of Current by Vehicle ECU The permission or the prohibition of the cut-off of the supply of current according to the first embodiment will be described with reference to Table 1 illustrated below.

TABLE 1

| All energy storage apparatuses being normal | Prohibit cut-off of supply of current with respect to all energy storage apparatuses |
| Normal energy storage apparatuses and abnormal energy storage apparatuses existing | Permit cut-off of supply of current with respect to abnormal energy storage apparatuses |
| All energy storage apparatuses being abnormal | Prohibit cut-off of supply of current with respect to two or more energy storage apparatuses |

When all the energy storage apparatuses 50 are normal, the vehicle ECU 31 prohibits the cut-off of the supply of current to all energy storage apparatuses.

When there exist the normal energy storage apparatus 50 and the abnormal energy storage apparatus 50 (the number of normal energy storage apparatuses 50 being 1 or more, and the number of abnormal energy storage apparatuses 50 being 1 or more), the vehicle ECU 31 permits the cut-off of the supply of current with respect to the abnormal energy storage apparatus 50. For example, when the number of energy storage apparatuses 50 is two and both of these two energy storage apparatuses 50 are normal, the cut-off of the supply of current is prohibited with respect to these two energy storage apparatuses 50. Thereafter, when one of these two energy storage apparatuses 50 becomes abnormal, the normal energy storage apparatus 50 and the abnormal energy storage apparatus 50 exist, and the cut-off of the supply of current is permitted with respect to the energy storage apparatus 50 that has become abnormal. With such a configuration, the energy storage apparatuses 50 can be protected from the abnormality. The normal energy storage apparatus 50 remains prohibited from cutting off the supply of current, and hence it is possible to reduce a risk that power is not supplied to the mobile body load.

When all energy storage apparatuses 50 are abnormal, the vehicle ECU 31 prohibits the cut-off of the supply of current with respect to two or more energy storage apparatuses 50. In the first embodiment, the number of the energy storage apparatuses 50 is two. Accordingly, the cut-off of the supply of current is prohibited with respect to all energy storage apparatuses 50. For example, when the number of energy storage apparatuses 50 is two, and either one of these two energy storage apparatuses 50 becomes abnormal, the cut-off of the supply of current is permitted with respect to one energy storage apparatuses. Thereafter, when the other energy storage apparatus 50 also becomes abnormal, the cut-off of the supply of current is prohibited with respect to the one energy storage apparatus 50. As a result, the cut-off of the supply of current is prohibited with respect to two or more energy storage apparatuses 50.

In a case where all energy storage apparatuses 50 become abnormal, by prohibiting the cut-off of the supply of current with respect to two or more energy storage apparatuses 50, a charge current can be shared and received by two or more energy storage apparatuses 50. In a case where a charge current is shared and received by two or more energy storage apparatuses 50, as compared with a case where the charge current is received by only one energy storage apparatus 50, the rise of a voltage of each energy storage apparatus 50 becomes slow so that the time until the battery performance of the energy storage apparatus 50 is lost is prolonged. Therefore, it is possible to secure a time during which the vehicle 10 can be safely stopped even if all energy storage apparatuses 50 become abnormal during traveling of the vehicle 10.

(1-4-3) Sequence

A sequence of a method for controlling the power supply system 30 will be described with reference FIG. 8 to FIG. 10. When the power supply system 30 is activated, power is supplied to the engine starter 21 to drive the engine of the vehicle 10. When the engine is driven, the alternator 23 starts power generation. When a power generation amount of the alternator 23 exceeds the electric load 25, a charge current flows into two energy storage apparatuses 50 so that two energy storage apparatuses 50 are charged.

Figure 8:
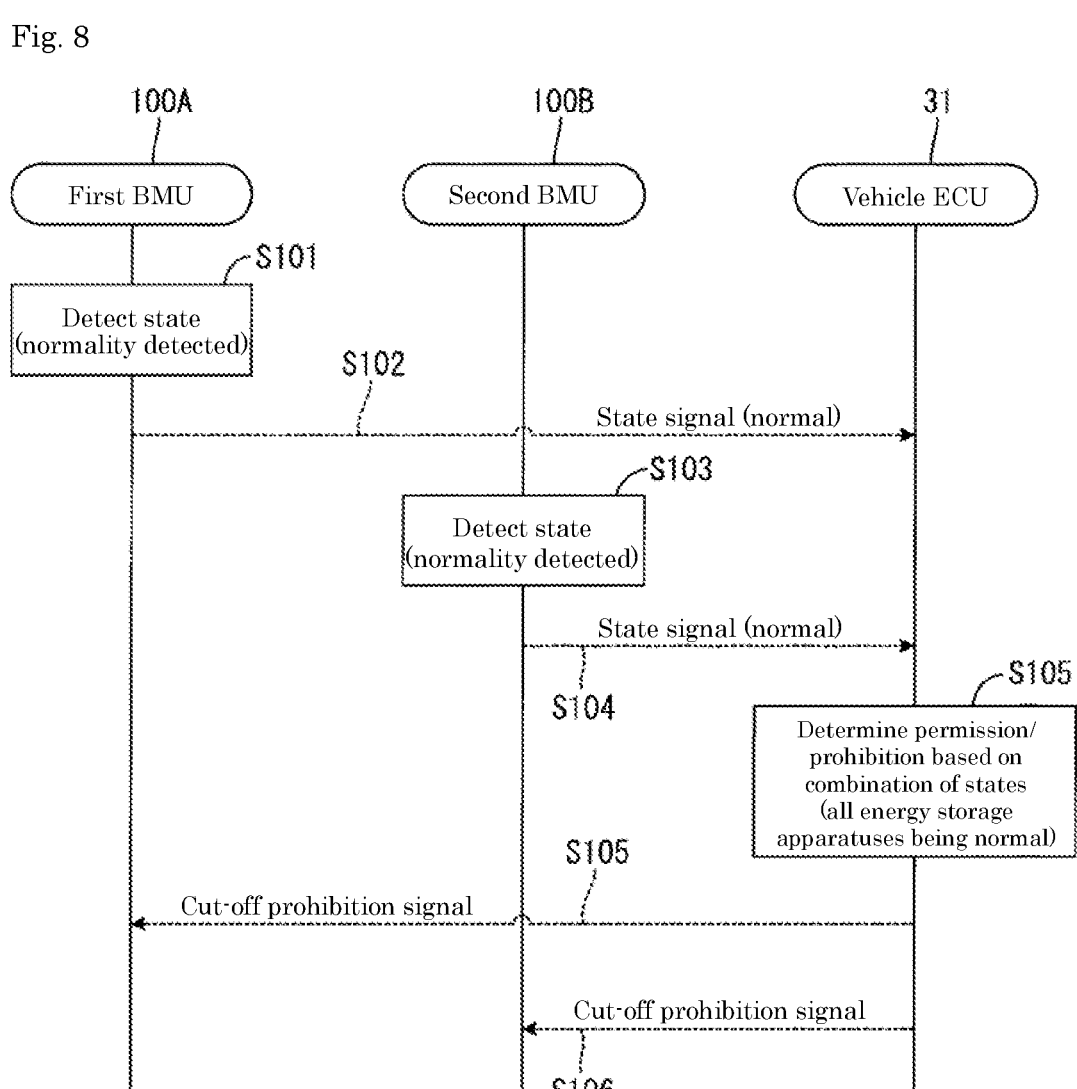
FIG. 8 is a sequence of control processing of the power supply system.

The sequence illustrated in FIG. 8 is started when the power supply system 30 is activated. At a point of time that the sequence illustrated in FIG. 8 is started, the respective energy storage apparatuses 50 are normal, and the current cut-off device 53 of each energy storage apparatus 50 is in an energized state.

The first BMU 100A detects a state (normal, abnormal) of the first energy storage apparatus 50A (S101), and transmits a state signal (normal) indicating the detected state to the vehicle ECU 31 (S102, an example of third processing).

The second BMU 100B detects a state of the second energy storage apparatus 50B (S103), and transmits a state signal (normal) indicating the detected state to the vehicle ECU 31 (S104, an example of third processing).

Upon receiving the state signals from the respective BMU 100, the vehicle ECU 31 determines whether or not to permit the cut-off of the supply of current with respect to the respective energy storage apparatuses 50 based on Table 1 described above (S105). In the example illustrated in FIG. 8, all energy storage apparatuses 50 are normal and hence, the vehicle ECU 31 determines to prohibit the cut-off of the supply of current with respect to all energy storage apparatuses 50. When all energy storage apparatuses 50 are normal, the vehicle ECU 31 transmits a cut-off prohibition signal to all energy storage apparatuses 50 (S105, S106).

When receiving the cut-off prohibition signal, the BMU 100 brings the current cut-off device 53 into an energized state regardless of whether the energy storage apparatus 50 is normal or abnormal (maintaining an energized state when the current cut-off device 53 is already in the energized state).

Figure 9:
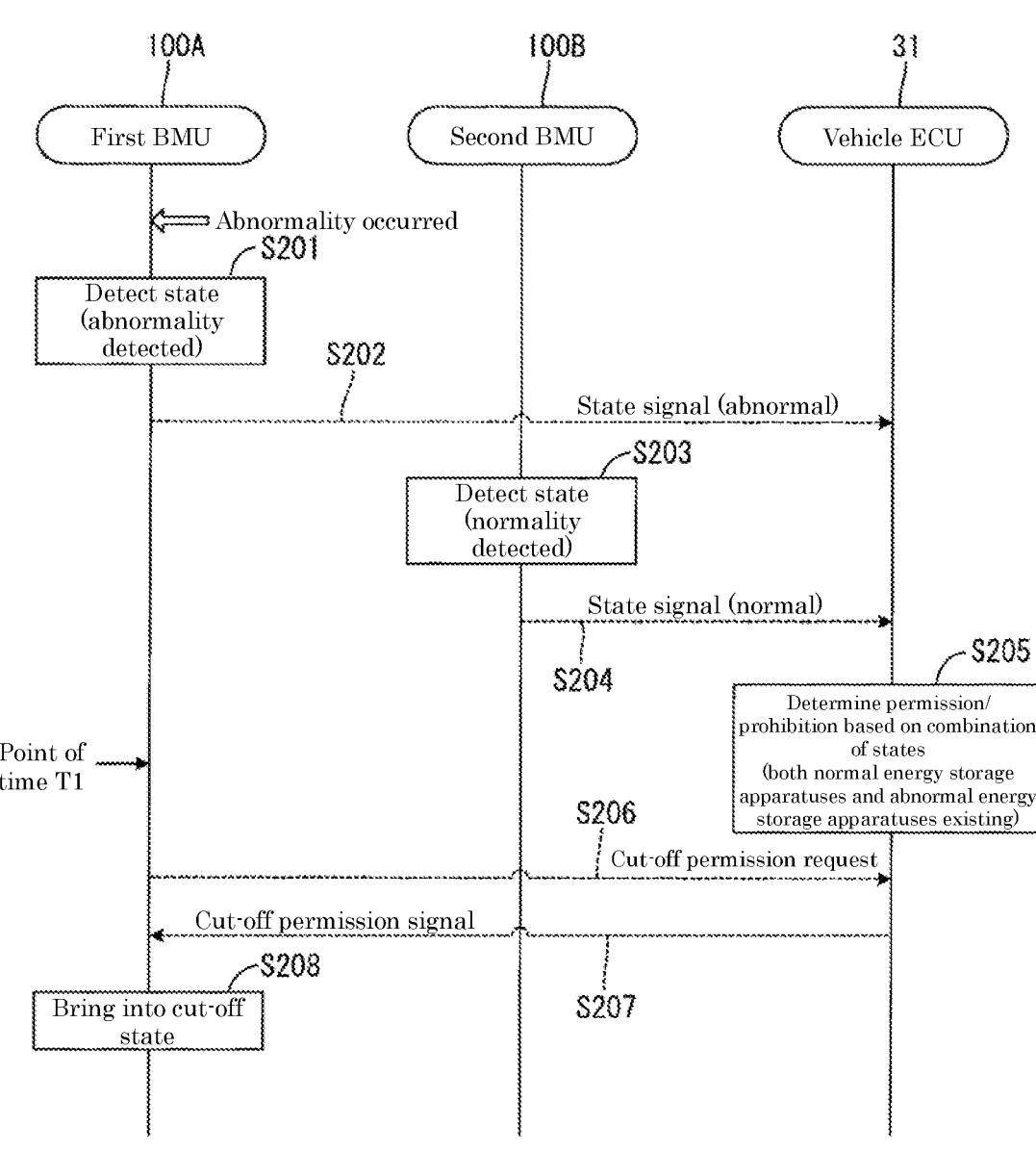
FIG. 9 is a sequence of control processing of the power supply system.

FIG. 9 illustrates a sequence when an abnormality occurs in the first energy storage apparatus 50A after the sequence illustrated in FIG. 8. At a point of time that the sequence illustrated in FIG. 9 is started, the respective energy storage apparatuses 50 are normal, and the current cut-off device 53 of each energy storage apparatus 50 is in an energized state.

The first BMU 100A detects that the first energy storage apparatus 50A is abnormal (S201), and transmits a state signal indicating the abnormality to the vehicle ECU 31 (S202). The cut-off of the supply of current is prohibited in S105, the first BMU 100A maintains the energized state even if an abnormality is detected in S201.

The second BMU 100B detects that the second energy storage apparatus 50B is normal (S203), and transmits a state signal indicating the normality to the vehicle ECU 31 (S204).

Upon receiving the state signals from the respective BMU 100, the vehicle ECU 31 determines whether or not to permit the cut-off of the supply of current with respect to the respective energy storage apparatuses 50 based on Table 1 described above (S205). In the example illustrated in FIG. 9, the normal energy storage apparatuses 50 and the abnormal energy storage apparatuses 50 exist and hence, the vehicle ECU 31 determines to permit the cut-off of the supply of current with respect to the abnormal energy storage apparatuses 50. Specifically, in the example illustrated in FIG. 9, the first energy storage apparatus 50A is abnormal and the second energy storage apparatus 50B is normal, the vehicle ECU 31 determines to permit the cut-off of the supply of current with respect to the first energy storage apparatus 50A.

When the abnormality of the first energy storage apparatus 50A is detected in S201, the first BMU 100A transmits a state signal (abnormality) to the vehicle ECU 31 in S202 and, then, transmits a cut-off permission request to the vehicle ECU 31 (S206, an example of a step of requesting permission to cut off of the supply of current).

Upon receiving the cut-off permission request from the first BMU 100A, the vehicle ECU 31 determines to permit the cut-off of the supply of current with respect to the first energy storage apparatus 50A in S205 and hence, the vehicle ECU 31 transmits a cut-off permission signal to the first BMU 100A (S207, an example of step of permitting or prohibiting the cut-off of the supply of current). When receiving the cut-off permission signal, the first BMU 100A brings the first current cut-off device 53A into a cut-off state (S208).

Figure 10:
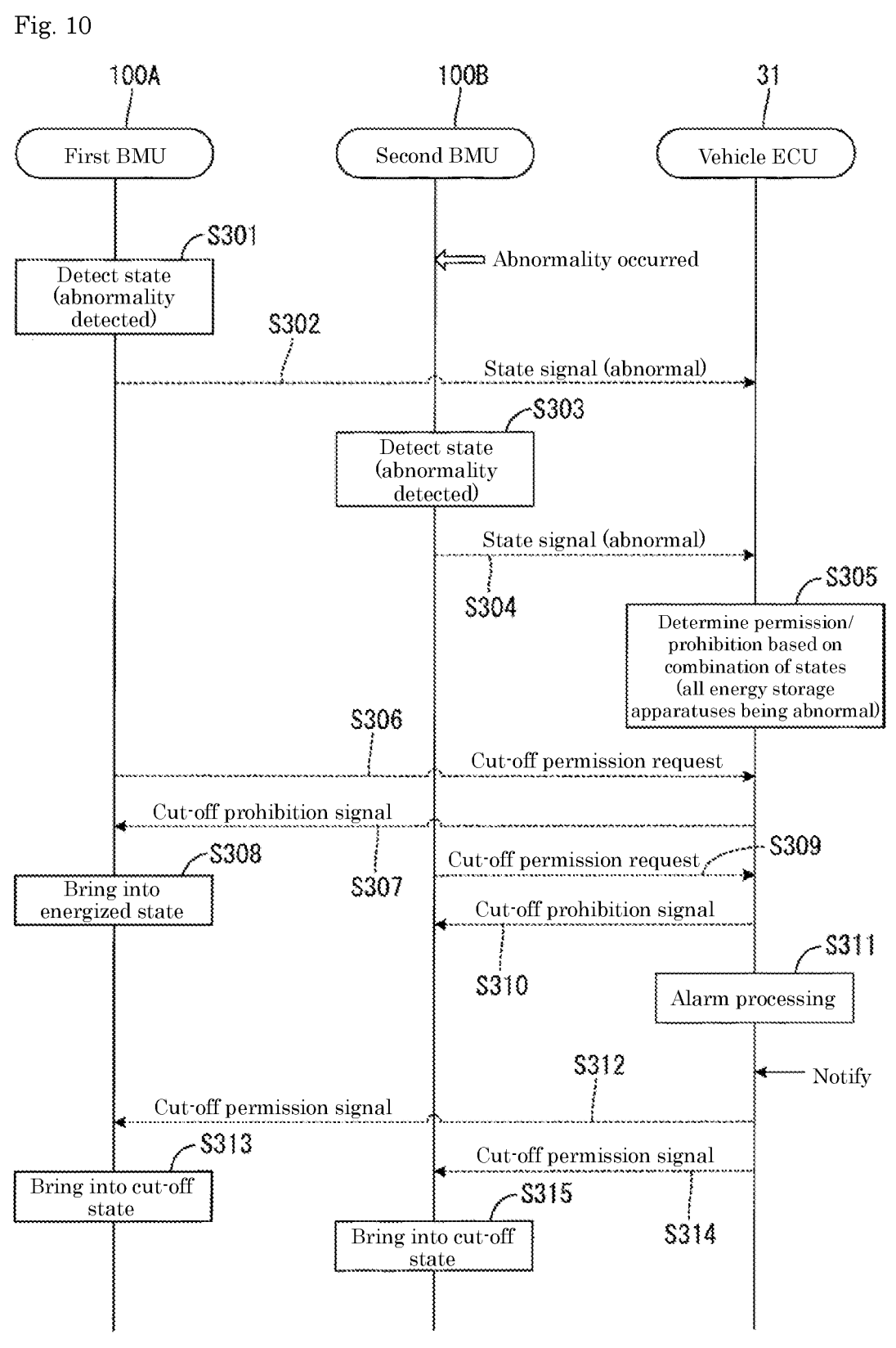

FIG. 10 illustrates a sequence when an abnormality occurs in the second energy storage apparatus 50B after the sequence illustrated in FIG. 9. At a point of time that the sequence illustrated in FIG. 10 is started, the first energy storage apparatus 50A is abnormal, and the second energy storage apparatus 50B is normal. At a point of time that the sequence illustrated in FIG. 10 is started, the first current cut-off device 53A is in a cut-off state, and the second current cut-off device 53B is in an energized state.

The first BMU 100A detects that the first energy storage apparatus 50A is abnormal (S301), and transmits a state signal indicating the abnormality to the vehicle ECU 31 (S302). The first BMU 100A has received the cut-off permission signal in S207 illustrated in FIG. 9 and hence, the first BMU 100A maintains the current cut-off device 53 in a cut-off state.

The second BMU 100B detects that the second energy storage apparatus 50B is abnormal (S303), and transmits a state signal indicating the abnormality to the vehicle ECU 31 (S304). The second BMU 100B has received the cut-off prohibition signal in S106 and hence, the second BMU 100A maintains the current cut-off device 53 in an energized state even when the second BMU 100B detects that the second energy storage apparatus 50B is abnormal.

Upon receiving the state signals from the respective BMU 100, the vehicle ECU 31 determines whether or not to permit the cut-off of the supply of current with respect to the respective energy storage apparatuses 50 based on Table 1 described above (S305). In the example illustrated in FIG. 10, all energy storage apparatuses 50 are abnormal and hence, the vehicle ECU 31 determines to prohibit the cut-off of the supply of current with respect to two or more energy storage apparatuses 50. In this embodiment, the number of the energy storage apparatuses 50 is two. As a result, it is determined that the cut-off of the supply of current is prohibited with respect to all energy storage apparatuses 50.

Even when the vehicle ECU 31 determines to prohibit the cut-off of the supply of current to two or more energy storage apparatuses 50 (in this case, all energy storage apparatuses 50), the vehicle ECU 31 does not immediately transmit the cut-off prohibition signal. That is, the vehicle ECU 31 transmits the cut-off prohibition signal after receiving the cut-off permission request from each energy storage apparatus 50. The above-mentioned processing is specifically described hereinafter.

When the first BMU 100A detects the abnormality of the first energy storage apparatus 50A in S301, the first BMU 100A transmits a state signal (abnormality) to the vehicle ECU 31 in S302 and, then, transmits a cut-off permission request to the vehicle ECU 31 (S306). Although the first BMU 100A has already received the cut-off permission signal in S207, it is assumed that, in the first embodiment, a cut-off permission request is transmitted every time the abnormality is detected.

Upon receiving the cut-off permission request from the first BMU 100A, the vehicle ECU 31 determines to prohibit the cut-off of the supply of current with respect to the all energy storage apparatuses 50 and hence, the vehicle ECU 31 transmits a cut-off prohibition signal to the first BMU 100A (S307). When the first BMU 100A receives the cut-off prohibition signal, the first BMU 100A switches the first current cut-off device 53A from a cut-off state to an energized state (S308).

When the second BMU 100B detects the abnormality of the second energy storage apparatus 50B in S303, the second BMU 100B transmits a state signal (abnormality) to the vehicle ECU 31 in S304 and, then, transmits a cut-off permission request to the vehicle ECU 31 (S309).

Upon receiving the cut-off permission request from the second BMU 100B, since the vehicle ECU 31 determines to prohibit the cut-off of the supply of current with respect to all BMUs 100B, the vehicle ECU 31 transmits a cut-off prohibition signal to the second BMU 100B (S310). Therefore, the second BMU 100B maintains the second current cut-off device 53B in an energized state even if the abnormality of the second energy storage apparatus 50B is detected.

When the vehicle ECU 31 determines that all energy storage apparatuses 50 are abnormal, the vehicle ECU 31 executes warning processing (S311). The warning process is a process of warning a driver so that the driver makes an emergency stop of the vehicle 10. For example, the vehicle ECU 31 turns on an abnormality notification lamp (not illustrated) mounted on the vehicle 10. By turning-on of the abnormality notification lamp, it is possible to notify the driver of the abnormality of the vehicle 10 and to urge the driver to make an emergency stop. A warning sound may not be generated. When overcharge occurs due to a failure of the alternator 23 or the like, it is considered that the behavior of the vehicle 10 becomes abnormal. In this case, it is difficult for the driver to pay attention to the abnormality notification light. However, the driver can easily recognize the abnormality by urging the driver to make the emergency stop also by voice.

When the vehicle 10 is urgently stopped and then the engine of the vehicle 10 is stopped, the ECU that controls the engine notifies the vehicle ECU 31 that the vehicle 10 is urgently stopped and the engine is stopped. Upon receiving the notification, the vehicle ECU 31 transmits a cut-off permission signal to each BMU 100 (S312, S314).

When each BMU 100 receives the cut-off permission signal from the vehicle ECU 31, the BMU 100 brings the current cut-off device 53 into a cut-off state (S313, S315).

With such processing, the use of the first energy storage apparatus 50A and the second energy storage apparatus 50B can be prohibited after the emergency stop of the vehicle 10.

(2-2) Case where Communication Between Vehicle ECU and BMU is Terminated

It is assumed that the communication between the vehicle ECU 31 and the BMU 100 is terminated at a point of point T1 illustrated in FIG. 9. The first BMU 100A transmits a state signal (abnormality) to the vehicle ECU 31 in S202 and, thereafter, transmits a cut-off permission request to the vehicle ECU 31 in S206. However, since the communication with the vehicle ECU 31 is terminated at the point of time in S206, the BMU 100 does not receive a response from the vehicle ECU 31. Therefore, the first BMU 100A remains prohibited from cutting off the supply of a current. The second energy storage apparatus 50B has received the cut-off prohibition signal in S106 and hence, the cut-off of the supply of current is prohibited.

Thereafter, when the sequence illustrated in FIG. 10 is executed, since the first BMU 100A is prohibited from cutting off the supply of current in S105, the first BMU 100A maintains the current cut-off device 53 in an energized state even if the abnormality is detected in S301. When the first BMU 100A detects the abnormality of the first energy storage apparatus 50A in S301, the first BMU 100A transmits a state signal (abnormality) to the vehicle ECU 31 in S302 and, then, transmits a cut-off permission request to the vehicle ECU 31 in S306. However, the communication with the vehicle ECU 31 is terminated at the point of time in S206, the first BMU 100A does not receive a response from the vehicle ECU 31. Therefore, the first BMU 100A remains prohibited from cutting off the supply of current.

The second BMU 100B also remains prohibited from cutting off the supply of current and hence, the second BMU 100B also maintains the current cut-off device 53 in an energized state even if an abnormality is detected in S303. When the second BMU 100B detects the abnormality of the second energy storage apparatus 50B in S303, the second BMU 100B also transmits a state signal (abnormality) to the vehicle ECU 31 in S304 and, then, transmits a cut-off permission request to the vehicle ECU 31 in S309. However, the communication with the vehicle ECU 31 is terminated at the point of time in S206, the first BMU 100A does not receive a response from the vehicle ECU 31. Therefore, the second BMU 100B remains prohibited from cutting off the supply of current.

(1-5) Advantageous Effects of Embodiment

In the control method according to the first embodiment, the cut-off of the supply of current is permitted or prohibited for each energy storage apparatus 50 so that at least one energy storage apparatus 50 is brought into an energized state based on the combination of the normality and the abnormality of respective energy storage apparatuses 50, and the current cut-off device 53 is brought into a cut-off state when the BMU 100 of the energy storage apparatus 50 that is permitted to cut off of the supply of current detects an abnormality of the energy storage apparatus 50 at a point of time that the cut-off of the supply of current is permitted. The current cut-off device 53 of the energy storage apparatus 50 that is permitted to cut off the supply of current is brought into a cut-off state and hence, it is possible to protect the energy storage apparatus 50 that is permitted to cut off the supply of current from abnormality. Even if all energy storage apparatuses 50 become abnormal, at least one energy storage apparatus 50 is in a state where the energy storage apparatus 50 is connected to the vehicle 10. Accordingly, it is possible to reduce a risk that power is not supplied to the mobile body load as compared with a case where none of the energy storage apparatuses 50 is connected to the vehicle 10.

According to the control method of the first embodiment, since the abnormality of the energy storage apparatus 50 includes the abnormality of the BMU 100, it is possible to secure the safety of the energy storage apparatus 50 in which the abnormality of the BMU 100 occurs while reducing the risk that the power is not supplied to the mobile body load.

According to the control method of the first embodiment, when all the energy storage apparatuses 50 are normal, the cut-off of the supply of current is prohibited with respect to each energy storage apparatus 50. With such a configuration, in a case where the communication between the vehicle ECU 31 and the energy storage apparatus 50 is terminated, even if an abnormality occurs in the energy storage apparatus 50, the vehicle ECU 31 does not permit the cut-off of the supply of current. Accordingly, the energy storage apparatus 50 remains prohibited from cutting off the supply of current. Accordingly, even when the communication between the vehicle ECU 31 and the energy storage apparatus 50 is terminated, it is possible to reduce a risk that power is not supplied to a mobile body load. The control method according to the first embodiment is particularly useful in the case of a power supply system where it is strongly required to reduce a risk that power is not supplied to a mobile body load.

According to the control method of the first embodiment, when all energy storage apparatuses 50 become abnormal, the cut-off of the supply of current is prohibited with respect to two or more energy storage apparatuses 50. Accordingly, the time until the energy storage apparatus 50 is overcharged (in other words, the time until the battery performance is lost) can be prolonged. Therefore, it is possible to secure a time during which the vehicle 10 can safely stop.

According to the power supply system 30 of the first embodiment, it is possible to reduce a risk that power is not supplied to a mobile body load even if all of a plurality of energy storage apparatuses 50 connected in parallel become abnormal.

According to the energy storage apparatus 50 of the first embodiment, it is possible to reduce a risk that power is not supplied to a mobile body load even if all of a plurality of energy storage apparatuses 50 connected in parallel become abnormal.

Second Embodiment

In the second embodiment, when the number of normal energy storage apparatuses 50 is two or more, the cut-off of the supply of current is permitted with respect to all energy storage apparatuses 50. The BMU 100 of the energy storage apparatus 50 that is permitted to cut off the supply of current cuts off the supply of current by bringing the current cut-off device 53 into a cut-off state when abnormality of the energy storage apparatus 50 is detected after the cut-off of the supply of current is permitted.

(1-4-2) Permission or the Prohibition of the Cut-Off of Supply of Current by Vehicle ECU The permission or the prohibition of the cut-off of the supply of current according to the second embodiment will be described with reference to Table 2 illustrated below.

TABLE 2

| The number of normal energy storage apparatuses being two or more | Permit cut-off of supply of current with respect to all energy storage apparatuses |
| --- | --- |
| The number of normal energy storage apparatuses being one | Permit cut-off of supply of current with respect to abnormal energy storage apparatuses, and prohibit cut-off of supply of current with respect to normal energy storage apparatuses |
| All energy storage apparatuses being abnormal | Prohibit cut-off of supply of current with respect to two or more energy storage apparatuses |

When the number of normal energy storage apparatuses 50 is two or more, the vehicle ECU 31 permits the cut-off of the supply of current with respect to all energy storage apparatuses 50. Since the vehicle ECU 31 permits the cut-off of the supply of current with respect to all energy storage apparatuses 50, when the BMU 100 of each energy storage apparatus 50 detects the abnormality of the energy storage apparatus 50 thereafter, the BMU 100 brings the current cut-off device 53 into a cut-off state. With such a configuration, the energy storage apparatuses 50 can be protected from the abnormality.

When the number of the normal energy storage apparatuses 50 is one, the vehicle ECU 31 permits the cut-off of the supply of current with respect to the abnormal energy storage apparatuses 50. On the other hand, the vehicle ECU 31 prohibits the cut-off of the supply of current with respect to one energy storage apparatus 50 that remains as the normal energy storage apparatus 50. For example, when the number of normal energy storage apparatuses 50 is two, the cut-off of the supply of current is permitted with respect to these energy storage apparatuses 50 Thereafter, when one energy storage apparatus 50 out of these two energy storage apparatuses 50 becomes abnormal, the number of normal energy storage apparatuses 50 becomes one. Accordingly, the cut-off of the supply of current is prohibited with respect to one energy storage apparatus 50 that remains as the normal energy storage apparatus 50 to the end. By prohibiting the cut-off of the supply of current with respect to one energy storage apparatus 50 that remains as the normal energy storage apparatus 50 to the end, it is possible to reduce a risk that power is not supplied to a mobile body load.

Table 2 is substantially the same as Table 1 in other points and hence, the description of these points is omitted.

(2-1) Sequence

A sequence of control processing of the power supply system 30 according to the second embodiment will be described with reference to FIG. 11 to FIG. 13.

Figure 11:
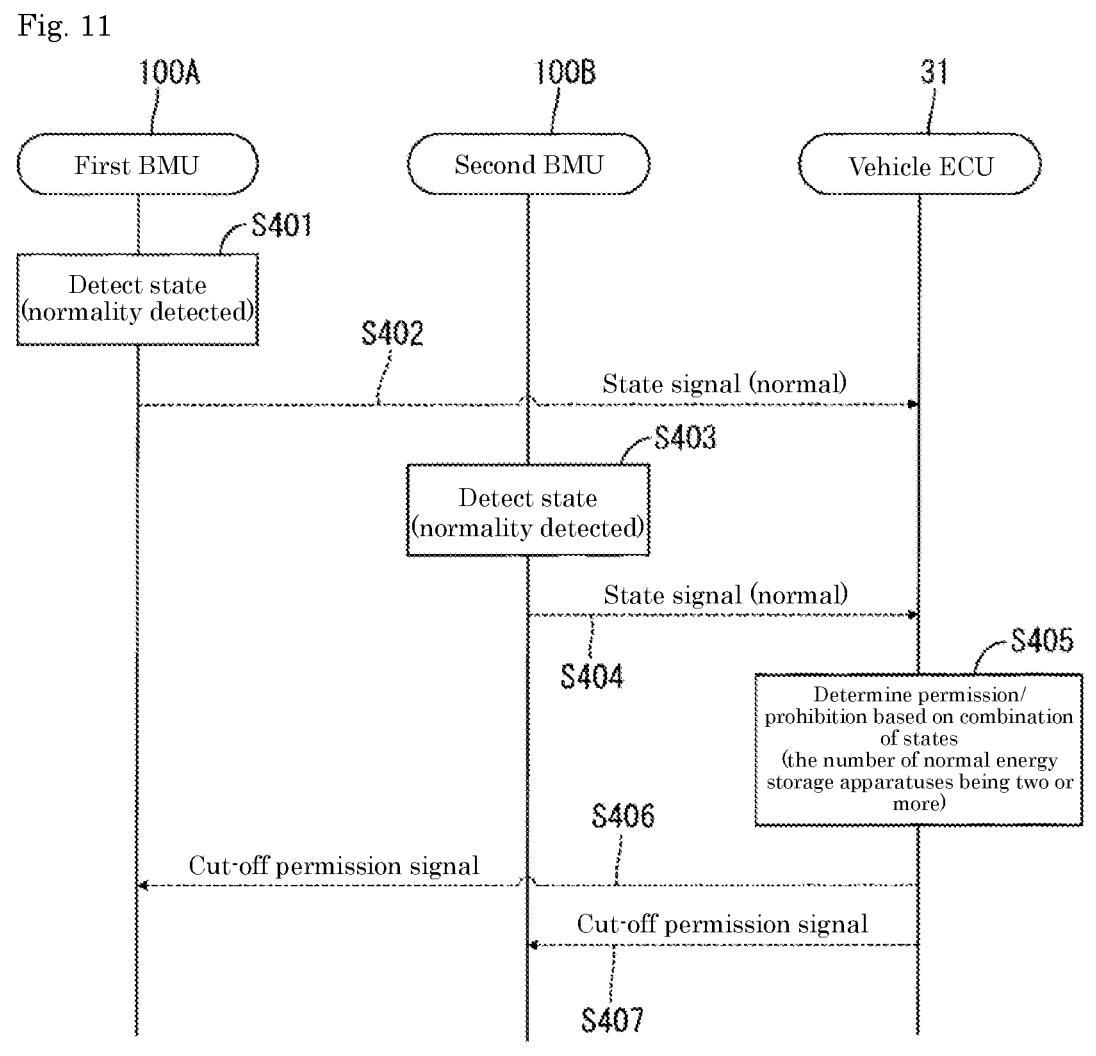

The sequence illustrated in FIG. 11 is started when the power supply system 30 is activated. At a point of time that the sequence illustrated in FIG. 11 is started, the respective energy storage apparatuses 50 are normal, and the current cut-off device 53 of each energy storage apparatus 50 is in an energized state.

The first BMU 100A detects a state of the first energy storage apparatus 50A (S401), and transmits a state signal indicating the detected state to the vehicle ECU 31 (S402, an example of third processing).

The second BMU 100B detects a state (normal, abnormal) of the second energy storage apparatus 50B (S403), and transmits a state signal indicating the detected state to the vehicle ECU 31 (S404, an example of third processing).

Upon receiving the state signals from the respective BMU 100, the vehicle ECU 31 determines whether or not to permit the cut-off of the supply of current with respect to the respective energy storage apparatuses 50 based on Table 2 described above (S405). The vehicle ECU 31 transmits a cut-off signal (an example of the permission signal) to the BMU 100 of the energy storage apparatus 50 that has determined to permit the cut-off of the supply of current, and transmits a cut-off prohibition signal (an example of the prohibition signal) to the BMU 100 of the energy storage apparatus 50 that has determined to prohibit the cut-off of the supply of current.

In the example illustrated in FIG. 11, two or more energy storage apparatuses 50 are normal and hence, the vehicle ECU 31 determines to permit the cut-off of the supply of current with respect to all energy storage apparatuses 50. Therefore, the vehicle ECU 31 transmits the cut-off permission signal to all BMUs 100 (S406, S407, an example of first step, first processing and fourth processing).

In the example illustrated in FIG. 11, the first energy storage apparatus 50A is normal at a point of time that the first BMU 100A receives a cut-off permission signal, and the first current cut-off device 53A is already in an energized state. Therefore, the first BMU 100A maintains the first current cut-off device 53A in an energized state. The same goes for the second energy storage apparatus 50B.

Figure 12:
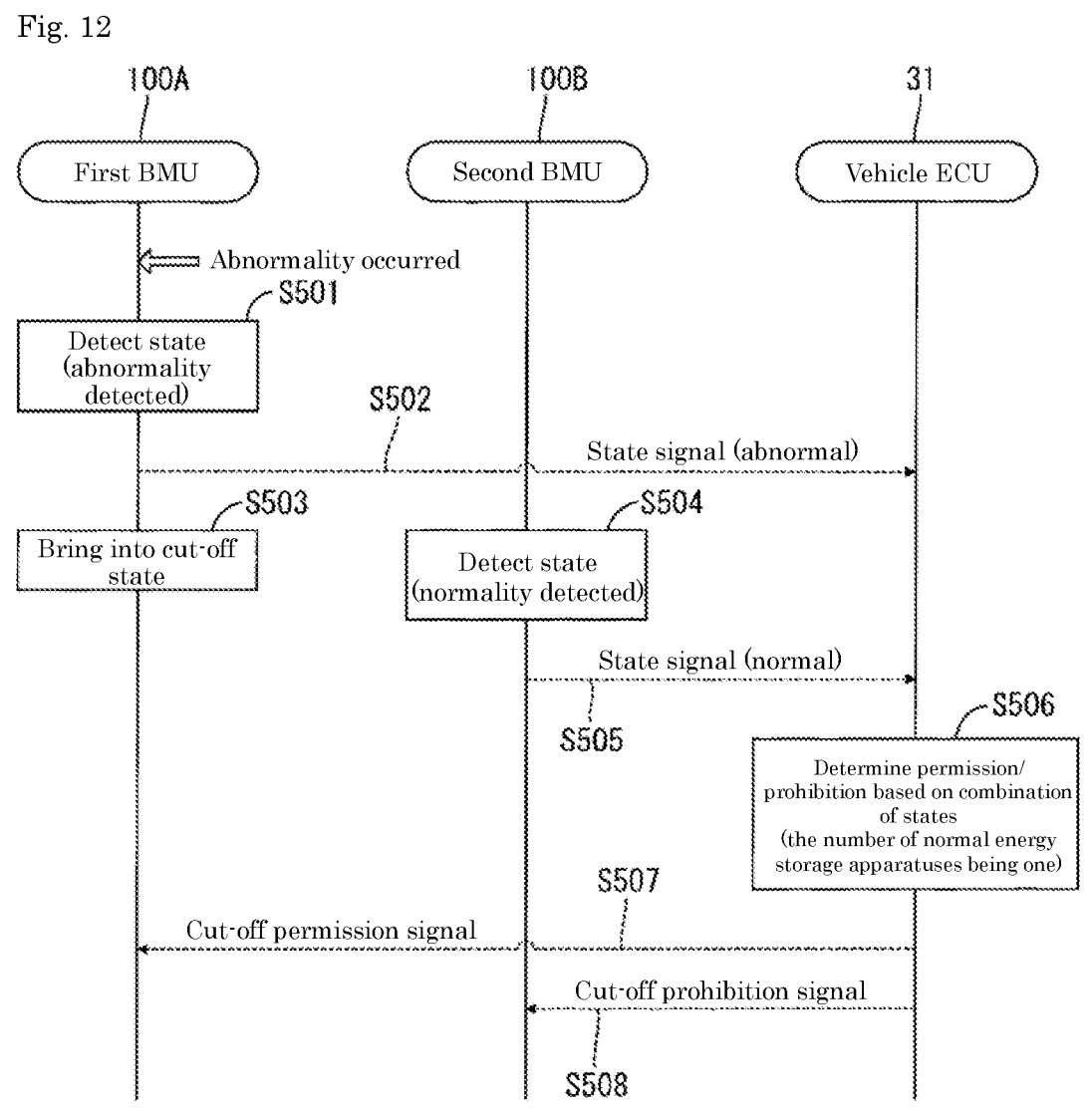

FIG. 12 illustrates a sequence when an abnormality occurs in the first energy storage apparatus 50A after the sequence illustrated in FIG. 11. At a point of time that the sequence illustrated in FIG. 12 is started, the respective energy storage apparatuses 50 are normal, and the current cut-off device 53 of each energy storage apparatus 50 is in an energized state.

The first BMU 100A detects that the first energy storage apparatus 50A is abnormal (S501), and transmits a state signal indicating the abnormality to the vehicle ECU 31 (S502). Since the first BMU 100A has already received the cut-off permission signal in S406 illustrated in FIG. 11, when the first BMU 100A detects an abnormality in S501, the first BMU 100A brings the first current cut-off device 53A into a cut-off state so as to cut off a current (S503, an example of second step and second processing). The second BMU 100B detects that the second energy storage apparatus 50B is normal (S504), and transmits a state signal indicating the normality to the vehicle ECU 31 (S505).

Upon receiving the state signals from the respective BMU 100, the vehicle ECU 31 determines whether or not to permit the cut-off of the supply of current with respect to the respective energy storage apparatuses 50 based on Table 2 described above (S506). In the case of the example illustrated in FIG. 12, the number of the normal energy storage apparatuses 50 is one and hence, the vehicle ECU 31 determines the cut-off of the supply of current is permitted with respect to the abnormal energy storage apparatus 50 (the first energy storage apparatus 50A). On the other hand, the vehicle ECU 31 determines that the cut-off of the supply of current is prohibited with respect to the normal energy storage apparatus 50 (the second energy storage apparatus 50B). Therefore, the vehicle ECU 31 transmits a shut-off permission signal to the first BMU 100A (S507), and transmits a shut-off prohibition signal to the second BMU 100B (5208).

In the example illustrated in FIG. 12, the first energy storage apparatus 50A is abnormal at a point of time that the first BMU 100A receives a cut-off permission signal n S507, and the first current cut-off device 53A is already in a cut-off state. Accordingly, the first BMU 100A maintains the first current cut-off device 53A in the cut-off state. The second current cut-off device 53B is already in an energized state at a point of time that the second BMU 100B receives a cut-off prohibition signal in S508 and hence, the second BMU 100B maintains the second current cut-off device 53B in an energized state.

Figure 13:
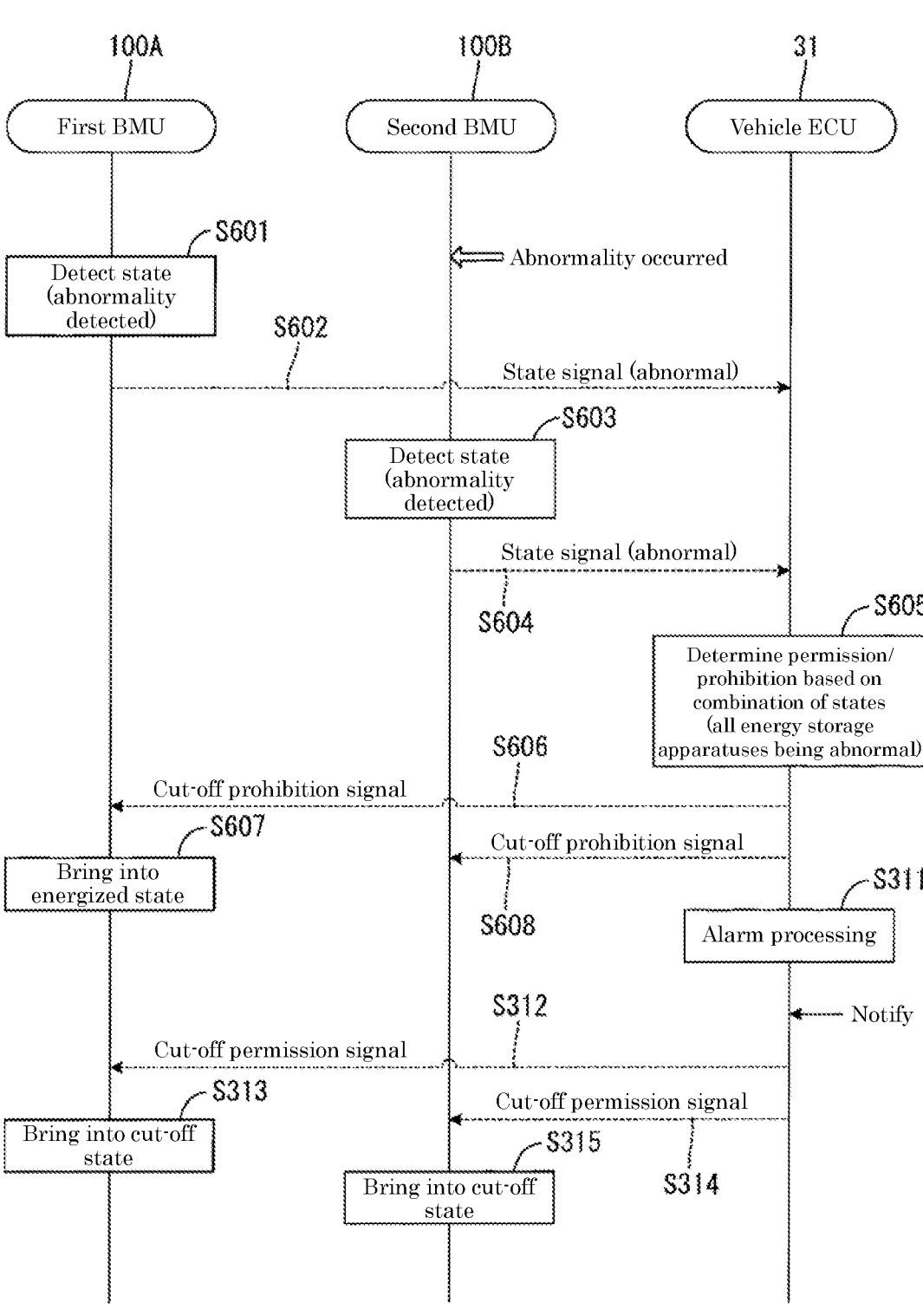
FIG. 13 is a sequence of control processing of the power supply system.

FIG. 13 illustrates a sequence when an abnormality occurs in the second energy storage apparatus 50B after the sequence illustrated in FIG. 12. At a point of time that the sequence illustrated in FIG. 13 is started, the first energy storage apparatuses 50A are abnormal, and the second energy storage apparatus 50B is normal. At a point of time that the sequence illustrated in FIG. 13 is started, the first current cut-off device 53A is in a cut-off state, and the second current cut-off device 53B is in an energized state.

The first BMU 100A detects that the first energy storage apparatus 50A is abnormal (S601), and transmits a state signal indicating the abnormality to the vehicle ECU 31 (S602). The first BMU 100A has received the cut-off permission signal in S507 illustrated in FIG. 12 and hence, the first BMU 100A maintains the first current cut-off device 53A in a cut-off state.

The second BMU 100B detects that the second energy storage apparatus 50B is abnormal (S603), and transmits a state signal indicating the abnormality to the vehicle ECU 31 (S604). The second BMU 100B has received the cut-off prohibition signal in S508 illustrated in FIG. 12 and hence, the second BMU 100B maintains the second current cut-off device 53B in an energized state even when the second BMU 100B detects that the second energy storage apparatus 50B is abnormal.

Upon receiving the state signals from the respective BMU 100, the vehicle ECU 31 determines whether or not to permit the cut-off of the supply of current with respect to the respective energy storage apparatuses 50 based on Table 2 described above (S605). In the example illustrated in FIG. 13, all energy storage apparatuses 50 are abnormal and hence, the vehicle ECU 31 determines to prohibit the cut-off of the supply of current with respect to two or more energy storage apparatuses 50. In this embodiment, the number of the energy storage apparatuses 50 is two. As a result, it is determined that the cut-off of the supply of current is prohibited with respect to all energy storage apparatuses 50. Therefore, the vehicle ECU 31 transmits a cut-off prohibition signal to the first BMU 100A, and transmits a cut-off prohibition signal to the second BMU 100B (S606, S608).

The first current cut-off device 53A is already in a cut-off state at a point of time that the first BMU 100A receives a cut-off prohibition signal and hence, the first BMU 100A immediately brings the first current cut-off device 53A in an energized state (S607). The second current cut-off device 53B is already in an energized state at a point of time that the second BMU 100B receives a cut-off prohibition signal and hence, the second BMU 100B maintains the second current cut-off device 53B in an energized state.

(2-3) Advantageous Effect of Embodiment

According to the control method of the second embodiment, when the number of normal energy storage apparatuses 50 is two or more, the cut-off of the supply of current is permitted with respect to all energy storage apparatuses 50. Accordingly, in the case of an abnormal energy storage apparatus 50, a current is immediately cut off. On the other hand, in the case of a normal energy storage apparatus 50, a current is cut off when the normal energy storage apparatus 50 becomes abnormal later. Accordingly, the safety of the energy storage apparatus 50 can be ensured. Assuming that two energy storage apparatuses 50 are normal and one of the energy storage apparatuses 50 becomes abnormal later, there exists only one normal energy storage apparatus 50. When the number of normal energy storage apparatuses 50 becomes only one, the cut-off of the supply of current is prohibited with respect to the energy storage apparatus 50 and hence, a risk that power is not supplied to a mobile body load can be reduced.

Third Embodiment

In the first embodiment described above, the vehicle ECU 31 permits or prohibits the cut-off of the supply of current with respect to the respective BMU 100. On the other hand, in the third embodiment, instead of the vehicle ECU 31, the first BMU 100A permits or prohibits the cut-off of the supply of current with respect to respective BMU 100 (including the first BMU 100A).

(3-1) Configuration of Power Supply System

Figure 14:
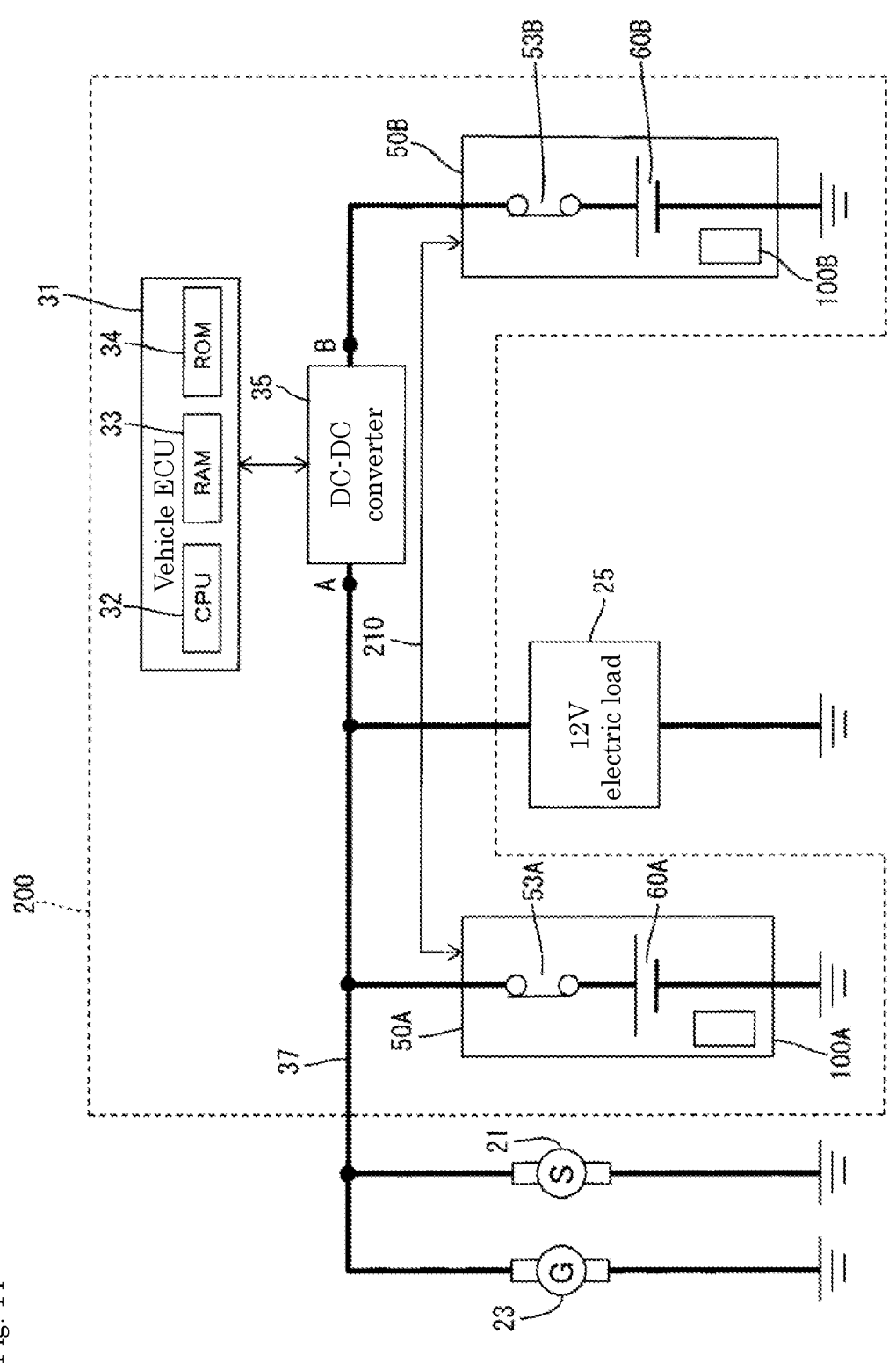
FIG. 14 is a block diagram of a power supply system according to a third embodiment.

As illustrated in FIG. 14, in the power supply system 30 according to the third embodiment, the first energy storage apparatus 50A and the second energy storage apparatus 50B are communicably connected to each other by a signal line 210.

The second BMU 100B transmits a state signal indicating the state of the second energy storage apparatus 50B to the first BMU 100A. The first BMU 100A determines whether or not to permit to cut off of the supply of current with respect to the respective energy storage apparatuses 50 (including the first energy storage apparatus 50A) based on a state of the first energy storage apparatus 50A and a state of the second energy storage apparatus 50B. This determination is made based on Table 1 described above. The first BMU 100A permits the cut-off of the supply of current with respect to itself when permitting the cut-off of the supply of current with respect to the first energy storage apparatus 50A, and prohibits the cut-off of the supply of current with respect to itself when prohibiting the cut-off of the supply of current with respect to the first energy storage apparatus 50A. The first BMU 100A transmits a cut-off permission signal to the second energy storage apparatus 50B when the cut-off of the current is permitted with respect to the second energy storage apparatus 50B, and transmits a cut-off prohibition signal when the cut-off of the supply of current is prohibited.

In this embodiment, the description has been made with respect to the case where the first BMU 100A permits or prohibits the cut-off of the supply of current with respect to the respective BMU 100 as an example. However, the configuration may be adopted where the second BMU 100B permits or prohibits the cut-off of the supply of current with respect to the respective BMU 100 (including the second BMU 100B).

(3-2) Advantageous Effect of Embodiment

According to the power supply system 30 of the third embodiment, it is possible to reduce a risk that power is not supplied to a mobile body load even if all of a plurality of energy storage apparatuses 50 connected in parallel become abnormal.

Fourth Embodiment

Figure 15:
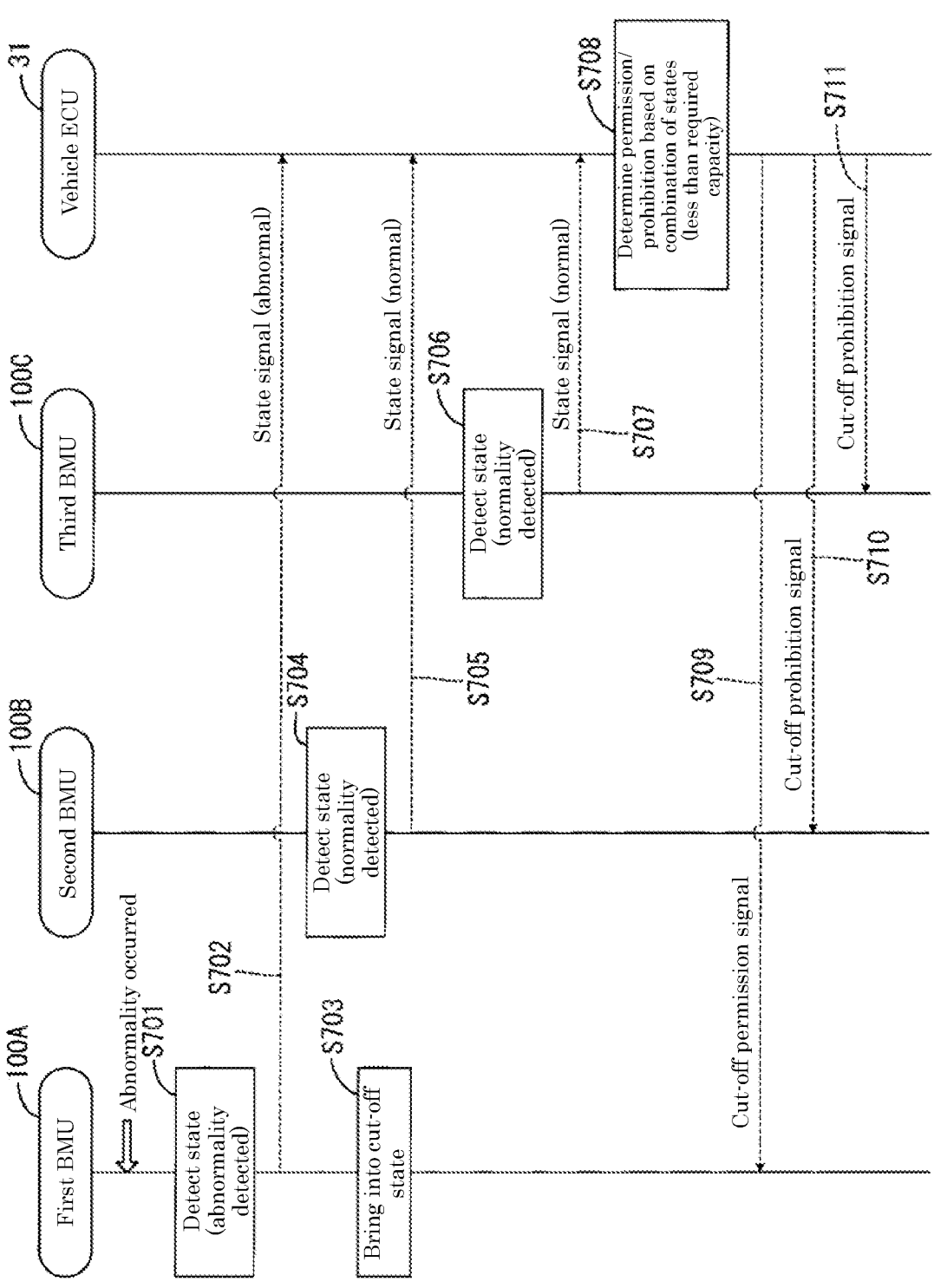
FIG. 15 is a sequence of control processing of the power supply system according to a fourth embodiment.

The fourth embodiment is described with reference to the FIG. 15. Fourth embodiment is a modification of the first to third embodiments. In this embodiment, the case where the fourth embodiment is the modification of the second embodiment will be described as an example.

According to the control method of the fourth embodiment, assuming that there are two or more energy storage apparatuses 50 are normal, and any one of the energy storage apparatuses 50 among the normal energy storage apparatus 50 becomes abnormal so that the current cut-off device 53 of the energy storage apparatus 50 is brought into a cut-off state, when a sum of remaining amounts of power of other normal energy storage apparatuses 50 becomes less than an amount of power required by the power supply system 30, the cut-off of the supply of current may be prohibited with respect to BMU 100 all normal energy storage apparatuses 50 for ensuring the amount of power required by the power supply system 30.

In the fourth embodiment, three energy storage apparatuses 50 (the first energy storage apparatus 50A described above, the second energy storage apparatus 50B described above, and a third energy storage apparatus 50C (not illustrated)) are connected to each other in parallel. In this case, the sum of a remaining amount of power of the second energy storage apparatus 50B and a remaining amount of power of the third energy storage apparatus 50C is larger than an amount of power required by the power supply system 30. However, the remaining amount of power of each of the second energy storage apparatus 50B and the third energy storage apparatus 50C in terms of a single device is less than the amount of power required for the power supply system 30.

(4-1) Sequence

A sequence of control processing of the power supply system 30 according to the fourth embodiment will be described with reference to FIG. 15. In FIG. 15, a third BMU 100C is a BMU of the third energy storage apparatus 50C. FIG. 15 is a sequence corresponding to FIG. 9 of the first embodiment. At a point of time that the sequence illustrated in FIG. 15 is started, the respective energy storage apparatuses 50 are normal, and the current cut-off device 53 of each energy storage apparatus 50 is in an energized state. At the start of the sequence shown in FIG. 15, the BMU 100 of each energy storage apparatus 50 has already received a cut-off permission signal from the vehicle ECU 31.

The first BMU 100A detects that the first energy storage apparatus 50A is abnormal (S701), and transmits a state signal indicating the abnormality to the vehicle ECU 31 (S702). Since the first BMU 100A has already received the cut-off permission signal, when the first BMU 100A detects an abnormality in S701, the first BMU 100A brings the first current cut-off device 53A into a cut-off state so as to cut off a current (S703, an example of second step and second processing).

The second BMU 100B detects that the second energy storage apparatus 50B is normal (S704), and transmits a state signal indicating the normality to the vehicle ECU 31 (S705). The third BMU 100C detects that the third energy storage apparatus 50C is normal (S706), and transmits a state signal indicating the normality to the vehicle ECU 31 (S707).

Upon receiving the state information from each BMU 100, the vehicle ECU 31 according to the fourth embodiment, since two or more energy storage apparatuses 50 are normal, permits the cut-off of the supply of current with respect to the first energy storage apparatus 50A in which the abnormality has occurred (S709).

Assuming that there are two or more energy storage apparatuses 50 are normal, and any one of the energy storage apparatuses 50 (the second energy storage apparatus 50B and the third energy storage apparatus 50C) becomes abnormal so that the current cut-off device 53 of the energy storage apparatus 50 is brought into a cut-off state, the vehicle ECU 31 determines whether or not a sum of remaining amounts of power of other normal energy storage apparatuses 50 becomes less than an amount of power required by the power supply system 30 (S708). The sum of the remaining amount of power of the second energy storage apparatus 50B and the remaining amount of power of the third energy storage apparatus 50C is equal to or more than the amount of power required by the power supply system 30. However, the remaining amount of power of each of the second energy storage apparatus 50B and the third energy storage apparatus 50C in terms of a single device is less than the amount of power required for the power supply system 30. Therefore, when the supply of current from either one energy storage apparatus 50 out of the second energy storage apparatus 50B and the third energy storage apparatus 50C is cut off, a sum of the remaining amounts of power of the other normal energy storage apparatuses 50 becomes less than the amount of power required by the power supply system 30. Therefore, the vehicle ECU 31 prohibits the cut-off of supply of current with respect to all normal energy storage apparatuses 50 (the second energy storage apparatus 50B and the third energy storage apparatus 50C). Specifically, the vehicle ECU 31 transmits a cut-off prohibition signal to the second BMU 100B and to the third BMU 100C (S710, S711).

(4-2) Advantageous Effect of Embodiment

According to the control method of the fourth embodiment, an amount of power required by the power supply system 30 can be ensured even the energy storage apparatus 50 becomes abnormal and hence, a risk that power is not supplied to a mobile body load can be reduced.

Fifth Embodiment

Fifth embodiment is a modification of the first to fourth embodiments. In this embodiment, the fifth embodiment is described as the modification of the second embodiment as an example. In the second embodiment described above the abnormality of the energy storage apparatus 50 includes: an abnormality of the secondary battery 62; and an abnormality of the BMU 100. On the other hand, in the fifth embodiment, the abnormality of the energy storage apparatus 50 means the abnormality of the BMU 100. Therefore, in the fifth embodiment, the abnormality of the secondary battery 62 is not included in the abnormality of the energy storage apparatus 50.

The permission or the prohibition of the cut-off of the supply of current according to the fifth embodiment will be described with reference to Table 3 illustrated below.

TABLE 3

| The number of energy storage apparatuses where BMU is normal being two or more | Permit cut-off of supply of current with respect to all energy storage apparatuses |
|---|---|
| The number of energy storage apparatuses where BMU is normal being one | Permit cut-off of supply of current with respect to energy storage apparatuses where BMU is abnormal, and prohibit cut-off of supply of current with respect to energy storage apparatuses where BMU is normal |

TABLE 3-continued

| BMU of all energy storage apparatuses being abnormal | Prohibit cut-off of supply of current with respect to two or more energy storage apparatuses |
| --- | --- |

When the number of energy storage apparatuses 50 where the BMU 100 is normal is two or more, the vehicle ECU 31 permits the cut-off of the supply of current with respect to all energy storage apparatuses 50. Since the vehicle ECU 31 permits the cut-off of the supply of current with respect to all energy storage apparatuses 50, when the BMU 100 of each energy storage apparatus 50 detects the abnormality of the BMU 100 thereafter, the BMU 100 of each energy storage apparatus 50 brings the current cut-off device 53 into a cut-off state. With such a configuration, the energy storage apparatuses 50 can be protected from the abnormality.

When the number of energy storage apparatuses 50 where the BMU 100 is normal is one, the vehicle ECU 31 permits the cut-off of the supply of current with respect to the energy storage apparatuses 50 where the BMU 100 is abnormal. On the other hand, the vehicle ECU 31 prohibits the cut-off of the supply of current with respect to one energy storage apparatus 50 that remains as the energy storage apparatus 50 to the end where the BMU 100 is normal. For example, when the number of energy storage apparatuses 50 where the BMU 100 is normal is two, the cut-off of the supply of current is permitted with respect to these energy storage apparatuses 50. Thereafter, when the BMU 100 of one energy storage apparatus 50 out of these two energy storage apparatuses 50 becomes abnormal, the number of energy storage apparatuses 50 where the BMU 100 is normal becomes one. Accordingly, the cut-off of the supply of current is prohibited with respect to one energy storage apparatus 50 that remains as the energy storage apparatus 50 where the BMU 100 is normal to the end. By prohibiting the cut-off of the supply of current with respect to one energy storage apparatus 50 that remains as the energy storage apparatus 50 where the BMU 100 is normal to the end, it is possible to reduce a risk that power is not supplied to a mobile body load.

When the BMUs 100 of all energy storage apparatuses 50 are abnormal, the vehicle ECU 31 prohibits the cut-off of the supply of current with respect to two or more energy storage apparatuses 50. In the fifth embodiment, the number of the energy storage apparatuses 50 is two. Accordingly, the cut-off of the supply of current is prohibited with respect to all energy storage apparatuses 50. For example, when the number of the energy storage apparatuses 50 is two and the BMU 100 of one energy storage apparatus 50 out of these two energy storage apparatuses 50 becomes abnormal, the number of energy storage apparatuses 50 where the BMU 100 is normal becomes one. Accordingly, the cut-off of the supply of current is prohibited with respect to one energy storage apparatus 50 that remains as the energy storage apparatus 50 where the BMU 100 is normal to the end. Thereafter, when the BMU 100 of one energy storage apparatus 50 that remains as the energy storage apparatus 50 where the BMU 100 is normal to the end also becomes abnormal, the cut-off of the supply of current is prohibited with respect to one energy storage apparatus 50. As a result, the cut-off of the supply of current is prohibited with respect to two or more energy storage apparatuses 50.

The fifth embodiment is substantially the same as the second embodiment in other points and hence, the description of these points is omitted.

According to the control method of the fifth embodiment, when the number of energy storage apparatuses 50 where BMU 100 is normal is two or more, the cut-off of the supply of current is permitted with respect to all energy storage apparatuses 50. Accordingly, in the case of the energy storage apparatus 50 where the BMU 100 is abnormal, a current is immediately cut off. On the other hand, in the case of the energy storage apparatus 50 where the BMU 100 is normal, a current is cut off when the BMU 100 of the energy storage apparatus 50 becomes abnormal later. Accordingly, the safety of the energy storage apparatus 50 can be ensured. Assuming that the BMUs 100 of two energy storage apparatuses 50 are normal and the BMU 100 of one of the energy storage apparatuses 50 becomes abnormal later, there exists only one energy storage apparatus 50 where the BMU 100 is normal. In a case where the number of the energy storage apparatuses 50 where the BMU 100 is normal is only one, by prohibiting the cut-off of the supply of current with respect to one energy storage apparatus 50 that remains as the energy storage apparatus 50 where the BMU 100 is normal to the end, it is possible to reduce a risk that power is not supplied to a mobile body load.

OTHER EMBODIMENTS

The present invention is not limited to the embodiments described with reference to the above description and drawings. For example, the following embodiments are also included in the technical scope of the present invention.

(1) In the first embodiment described above, the case where the energy storage apparatus 50 includes the plurality of secondary batteries 62 has been described as an example. However, the energy storage apparatus 50 may include only one secondary battery 62.

The energy storage device is not limited to the secondary battery 62, and may be a capacitor or the like.

Although the DC-DC converter 35 is included in the power supply system 30, the DC-DC converter 35 may not be included in the power supply system 30. For example, when there is no difference in usage between the first energy storage apparatus 50A and the second energy storage apparatus 50B, there is little need to adjust charging and discharging of the second energy storage apparatus 50B alone independently, and the DC-DC converter 35 may be omitted.

When there exists an adjustment device such as the DC-DC converter 35, the rated voltages of the two energy storage apparatuses 50 may be the same or different from each other.

A threshold voltage Va for bringing the first current cut-off device 53A of the first energy storage apparatus 50A into a cut-off state and a threshold voltage Va for bringing the second current cut-off device 53B of the second energy storage apparatus 50B into a cut-off state may be different from each other.

(2) In the first embodiment described above, the energy storage device (secondary battery 62), the current cut-off device 53, and the BMU 100 are housed in the housing 71 of the energy storage apparatus 50. It is sufficient that at least the energy storage device and the measurement instruments are housed in the housing 71. The current cut-off device 53 and the BMU 100 may be disposed outside the housing 71.

(3) In the first embodiment described above, when an emergency stop of the vehicle 10 is completed and the engine is stopped, the current cut-off device 53 is brought into a cut-off state so as to prohibit the use of the energy storage apparatus 50. The timing of prohibiting the use of the energy storage apparatus 50 may be a point of time after a predetermined period elapses from the stop of the engine. By setting the timing at which the use of the energy storage apparatus 50 is prohibited to a point of time after a predetermined time elapses from the engine stop, it is possible to secure a time for notifying the outside of a situation that the vehicle 10 is in an emergency stop state by turning on a hazard lamp or the like.

(4) In the embodiments described above, the case has been described where the cut-off of the supply of current is prohibited with respect to two or more energy storage apparatuses 50 when all energy storage apparatuses 50 become abnormal. However, the cut-off of the supply of current may be prohibited with respect to only one energy storage apparatus 50. It is because that, by prohibiting the cut-off of the supply of current to at least one energy storage apparatus 50, it is possible to prevent the occurrence of a situation where power is not supplied to a mobile body load.

In the case where the cut-off of the supply of current is prohibited with respect to one energy storage apparatus 50 when all energy storage apparatuses 50 become abnormal, the energy storage apparatus 50 to which the prohibition of the cut-off of the supply of current is applied may be determined based on a type of abnormality. In this case, it is assumed that the respective energy storage apparatuses 50 transmit different types of abnormalities to the vehicle ECU 31. Specifically, when the secondary battery 62 is abnormal, in a case where the energy storage apparatus 50 is continuously used, there is a possibility that the energy storage apparatus 50 becomes completely unusable. On the other hand, when the BMU 100 is abnormal, provided that the secondary battery 62 is normal, a possibility that the energy storage apparatus 50 becomes completely unusable is relatively low even if the energy storage apparatus 50 is continuously used.

Therefore, when one energy storage apparatus 50 has an abnormality in the secondary battery 62 and the other energy storage apparatus 50 has an abnormality in the BMU 100, the cut-off of the supply of current may be permitted with respect to the energy storage apparatus 50 having an abnormality in the secondary battery 62, and the cut-off of the supply of current may be prohibited with respect to the energy storage apparatus 50 having an abnormality in the BMU 100. By adopting such a configuration, the possibility that the energy storage apparatus 50 becomes completely unusable can be reduced as compared with the case where the cut-off of the supply of current is prohibited with respect to the energy storage apparatus 50 having abnormality in the secondary battery 62.

Alternatively, types of abnormalities of the energy storage apparatus 50 may be roughly classified into overcharge and other abnormalities. Other abnormalities are, for example, overdischarge, overcurrent, temperature abnormality, abnormality in the BMU 100, and the like. When the charge is continued after the overcharge, the overcharged energy storage apparatus 50 exhibits a shorter time until the energy storage apparatus 50 reaches a voltage at which the energy storage apparatus 50 loses its battery performance than the energy storage apparatuses 50 having other abnormalities. Therefore, when one energy storage apparatus 50 has overcharge and the other energy storage apparatus 50 has an abnormality other than overcharge, the cut-off of the supply of current may be permitted with respect to the energy storage apparatus 50 having overcharge, and the cut-off of the supply of current may be prohibited with respect to the energy storage apparatus 50 having an abnormality other than overcharge. In this case, when charging is continued, a charging current can be received by the energy storage apparatus 50 which is not overcharged. By allowing the energy storage apparatus 50 that is not overcharged to receive a charging current, compared with a case where a charging current is received by the energy storage apparatus 50 that is overcharged, a time until the energy storage apparatus 50 reaches a voltage at which the battery performance of the energy storage apparatus 50 is lost is prolonged. Therefore, a time until the vehicle 10 can be safely stopped can be secured.

Also, in the case where the cut-off of the supply of current is prohibited with respect to two or more energy storage apparatuses 50 when all energy storage apparatuses 50 become abnormal, the energy storage apparatus 50 to which the prohibition of the cut-off of the supply of current is applied may be determined based on a type of abnormality. For example, assume a case where there are three energy storage apparatuses 50, wherein one energy storage apparatus 50 has an abnormality in the secondary battery 62, and other two energy storage apparatuses 50 have abnormality in the BMU 100. In this case, the cut-off of the supply of current may be prohibited with respect to two energy storage apparatuses 50 that have abnormality in the BMU 100. By adopting such a configuration, compared to a case where the cut-off of the supply of current is determined without based on a type of abnormality, it is possible to reduce a possibility that the energy storage apparatus 50 where the cut-off of the supply of current is prohibited becomes completely unusable.

(5) In the embodiments described above, abnormality in the current cut-off device 53 is not included in the abnormality in the BMU 100. However, the abnormality in the current cut-off device 53 may include abnormality in the BMU 100.

(6) In the embodiments described above, the energy storage apparatus has been described by taking the energy storage apparatus 50 that includes the lithium ion batteries as an example. On the other hand, a part of the plurality of energy storage apparatuses may be formed of lead-acid batteries. For example, when there are two energy storage apparatuses, one energy storage apparatus may be the energy storage apparatus 50 that includes lithium ion batteries, and the other energy storage apparatus may be the energy storage apparatus 50 that includes lead-acid batteries. Usually, the lead-acid battery includes neither the current cut-off device 53 nor the BMU 100. Therefore, in the case of a lead-acid battery, the current cut-off device 53 and a current sensor (or a voltage sensor) may be provided outside the lead-acid battery, and the vehicle ECU 31 may function as a BMU of the lead-acid battery. In this case, permission or prohibition of the cut-off of the supply of current with respect to the lead-acid battery means that the vehicle ECU 31 permits or prohibits the cut-off of the supply of current by the current cut-off device with respect to the vehicle ECU 31 itself (the vehicle ECU 31 functioning as the BMU of the lead-acid battery).

(7) In the embodiments described above, the vehicle 10 (engine driven vehicle) is exemplified as the mobile body. However, the mobile body is not limited to the engine driven vehicle. For example, the mobile body may be an electric vehicle or a hybrid vehicle, or may be a forklift or an automatic guided vehicle (AGV) that travels by an electric motor.

The invention claimed is:

1. A method for controlling a power supply system of a mobile body where the power supply system includes a plurality of energy storage apparatuses, connected to a mobile body load in parallel, and a control unit, the plurality of energy storage apparatuses including a first energy storage apparatus that includes an energy storage device, a current cut-off device connected to the energy storage device in series, and a management device, the method comprising:

prohibiting cut-off of supply of current, which is performed by the control unit through communication with the management device of the first energy storage apparatus, when all the plurality of energy storage apparatuses are normal;

permitting the cut-off of supply of current, which is performed by the control unit through communication with the management device of the first energy storage apparatus, based on a combination of normality and abnormality of the respective energy storage apparatuses such that at least one of the plurality of energy storage apparatuses continues the supply of current to the mobile body load; and bringing the current cut-off device into a cut-off state, which is performed by the management device of the first energy storage apparatus, when the management device of the first energy storage apparatus, which is permitted to cut off the supply of current, detects an abnormality of the first energy storage apparatus at a point of time that the cut-off of the supply of current is permitted, or when the management device detects an abnormality of the first energy storage apparatus after the cut-off of the supply of current is permitted.

2. The method according to claim 1, wherein the abnormality of the first energy storage apparatus includes an abnormality of the management device.

3. The method according to claim 1, wherein when all the plurality of energy storage apparatuses are abnormal, the cut-off of the supply of current is prohibited with respect to two or more of energy storage apparatuses.

4. The method according to claim 1, wherein when all the plurality of energy storage apparatuses are abnormal, the energy storage apparatus, to which prohibition of the cut-off of the supply of current is to be applied, is determined based on a type of abnormality of the energy storage apparatuses.

5. A power supply system of a mobile body comprising:

a plurality of energy storage apparatuses connected to a mobile body load in parallel; and a control unit, wherein the plurality of energy storage apparatuses includes a first energy storage apparatus that includes an energy storage device, a current cut-off device connected to the energy storage device in series, and a management device in communication with the control unit, the control unit is configured to perform:

prohibiting the management device of the first energy storage apparatus from cutting-off supply of current, when all the plurality of energy storage apparatuses are normal;

permitting the management device of the first energy storage apparatus to cut-off supply of current based on a combination of normality and abnormality of the respective energy storage apparatuses such that at least one of the plurality of energy storage apparatuses continues the supply of current to the mobile body load; and the management device of the first energy storage apparatus is configured to perform:

bringing the current cut-off device into a cut-off state when the management device of the first energy storage apparatus, which is permitted to cut off the supply of current, detects an abnormality of the first energy storage apparatus at a point of time that the cut-off of the supply of current is permitted, or when the management device detects an abnormality of the first energy storage apparatus after the cut-off of the supply of current is permitted.

6. A power supply system of a mobile body comprising:

first and second energy storage apparatuses that are connected to a mobile body load in parallel, wherein each of the first and second energy storage apparatuses includes an energy storage device, a current cut-off device connected to the energy storage device in series, and a management device, the management device of the first energy storage apparatus is configured to perform:

prohibiting the management devices of the respective energy storage apparatuses from cutting-off of supply of current, when the respective energy storage apparatuses are normal;

permitting the management device of either of the first or second energy storage apparatus to cut-off supply of current based on a combination of normality and abnormality of the respective energy storage apparatuses such that at least one of the first and second energy storage apparatuses continues the supply of current to the mobile body load; and bringing the current cut-off device into a cut-off state when the management device of either of the first or second energy storage apparatus, which is permitted to cut off the supply of current, detects an abnormality of either of the first or second energy storage apparatus at a point of time that the cut-off of the supply of current is permitted, or when the management device detects an abnormality of either of the first or second energy storage apparatus after the cut-off of the supply of current is permitted.

7. An energy storage apparatus used in a power supply system of a mobile body, the energy storage apparatus comprising:

an energy storage device;

a current cut-off device that is connected in series with the energy storage device;

a management device;

a current sensor; and a housing provided with positive and negative external terminals and a connector, to which a communication cable for communicably connecting the energy storage apparatus to an external control unit is connected, the housing accommodating the energy storage device, the current cut-off device, the management device, and the current sensor, wherein the energy storage device, the current cut-off device, and the current sensor are connected in series via a power line extending within the housing between the positive and negative external terminals, and the management device is configured to perform:

detecting normality or abnormality of the energy storage apparatus and transmitting a detection result of the normality or the abnormality to the external control unit;

receiving from the external control a prohibition signal prohibiting cut-off of supply of current;

requesting the external control unit cut-off of supply of current;

receiving from the external control unit a permission signal permitting cut-off of supply of current; and bringing the current cut-off device into a cut-off state in a case where the abnormality of the energy storage apparatus is detected at a point of time that the permission signal is received or in a case where the abnormality of the energy storage apparatus is detected after the permission signal is received.

8. The energy storage apparatus according to claim 7, further comprising a voltage detector that detects a voltage of the energy storage device, wherein the management device maintains the energized state of the current cut-off device even when the voltage of the energy storage device is lower than a lower limit value of the energy storage device.

* * * * *